United States Patent
Heron et al.

(10) Patent No.: US 11,283,707 B2
(45) Date of Patent: *Mar. 22, 2022

(54) SEGMENT ROUTING WITH FAST REROUTE FOR CONTAINER NETWORKING

(71) Applicant: Cisco Technology, Inc., San Jose, CA (US)

(72) Inventors: Giles Douglas Yorke Heron, London (GB); Edward A. Warnicke, Austin, TX (US); William Mark Townsley, Paris (FR); Yoann Desmouceaux, Paris (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/071,919

(22) Filed: Oct. 15, 2020

(65) Prior Publication Data

US 2021/0036951 A1 Feb. 4, 2021

Related U.S. Application Data

(63) Continuation of application No. 16/138,595, filed on Sep. 21, 2018, now Pat. No. 10,812,374.

(51) Int. Cl.
*H04L 12/707* (2013.01)
*H04L 12/715* (2013.01)
(Continued)

(52) U.S. Cl.
CPC .............. *H04L 45/22* (2013.01); *H04L 45/04* (2013.01); *H04L 45/28* (2013.01); *H04L 45/34* (2013.01);
(Continued)

(58) Field of Classification Search
CPC ......... H04L 45/04; H04L 45/22; H04L 45/28; H04L 45/34; H04L 61/256; H04L 45/306; H04L 2212/00; H04Q 3/54591
See application file for complete search history.

(56) References Cited

U.S. PATENT DOCUMENTS

2014/0122875 A1 5/2014 Pizi et al.
2015/0109902 A1 4/2015 Kumar et al.
(Continued)

FOREIGN PATENT DOCUMENTS

| CN | 105324765 A | 2/2016 |
|---|---|---|
| CN | 108370333 A | 8/2018 |
| WO | 2018146526 A1 | 8/2018 |

OTHER PUBLICATIONS

International Search Report and Written Opinion from the International Searching Authority, dated Nov. 20, 2019, 12 pages, for corresponding International Patent Application No. PCT/US2019/050663.

(Continued)

*Primary Examiner* — Omer S Mian
(74) *Attorney, Agent, or Firm* — Polsinelli PC

(57) ABSTRACT

Systems and methods provide for segment routing (SR) with fast reroute in a container network. An SR ingress can receive a packet from a first container destined for a container service. The ingress can generate an SR packet including a segment list comprising a first segment to a first container service host, a second segment to a second service host, and a third segment to the service. The ingress can forward the SR packet to a first SR egress corresponding to the first host using the first segment. The first egress can determine whether the first service and/or host is reachable. If so, the first egress can forward the SR packet to the first host or the packet to the service. If not, the first egress can (Continued)

perform a fast reroute and forward the SR packet to a second SR egress corresponding to the second host using the second segment.

20 Claims, 24 Drawing Sheets

(51) Int. Cl.
*H04L 12/703* (2013.01)
*H04L 12/721* (2013.01)
*H04L 29/12* (2006.01)
*H04L 45/00* (2022.01)
*H04L 45/28* (2022.01)
*H04L 61/256* (2022.01)
*H04L 12/725* (2013.01)
*H04L 45/30* (2022.01)

(52) U.S. Cl.
CPC .......... *H04L 61/256* (2013.01); *H04L 45/306* (2013.01); *H04L 45/38* (2013.01); *H04L 2212/00* (2013.01)

(56) References Cited

U.S. PATENT DOCUMENTS

| | | |
|---|---|---|
| 2015/0304206 A1 | 10/2015 | Filsfils et al. |
| 2017/0230274 A1 | 8/2017 | Filsfils et al. |
| 2019/0116110 A1 | 4/2019 | Raney |
| 2019/0349268 A1 | 11/2019 | Pai et al. |

OTHER PUBLICATIONS

Desmouceaux, Yoann, et al., "6LB: Scalable and Application-Aware Load Balancing with Segment Routing," IEEE/ACM Transactions on Networking, vol. 26, No. 2, Apr. 30, 2018, 16 pages.

Filsfils, C., et al., "SRv6 Network Programming," draft-filsfils-spring-srv6-network-programming-04, Mar. 4, 2018, 58 pages.

Filsfils, C., et al. "Segment Routing interoperability with LDP," draft-ietf-spring-segment-routing-ldp-interop, Oct. 14, 2015, 15 pages.

Filsfils, C., et al., "Segment Routing Architecture," draft-ietf-spring-segment-routing-14, Dec. 20, 2017, 31 pages.

Filsfils, C., et al., "SRv6 Network Programming," draft-filsfils-spring-srv6-network-programming-01, Jun. 28, 2017, 42 pages.

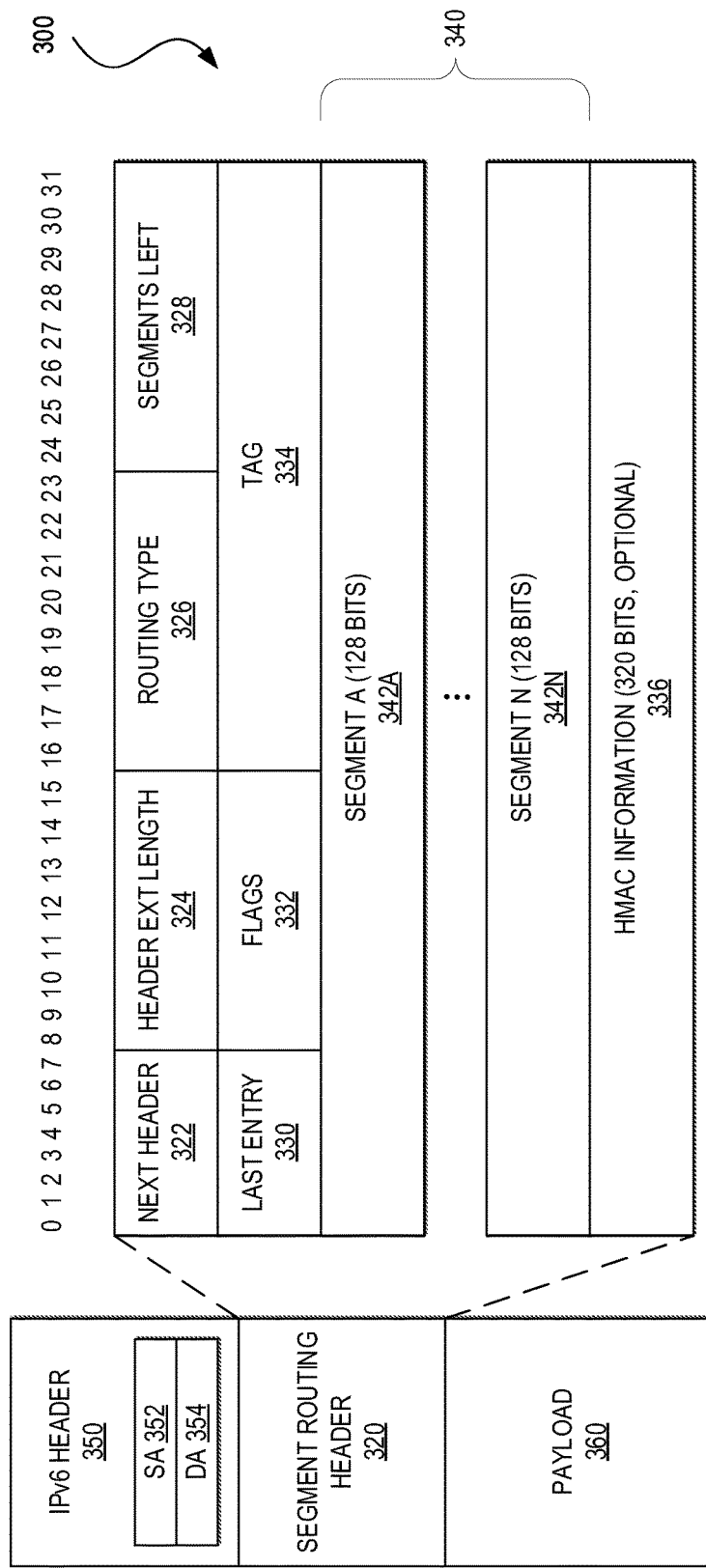
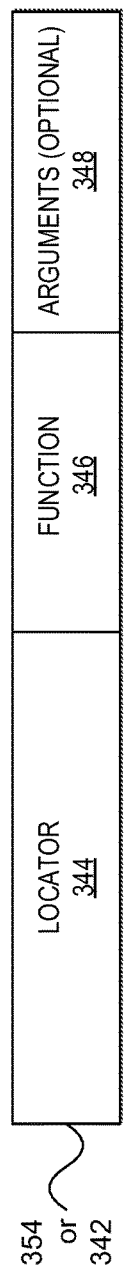
FIG. 3A
FIG. 3B

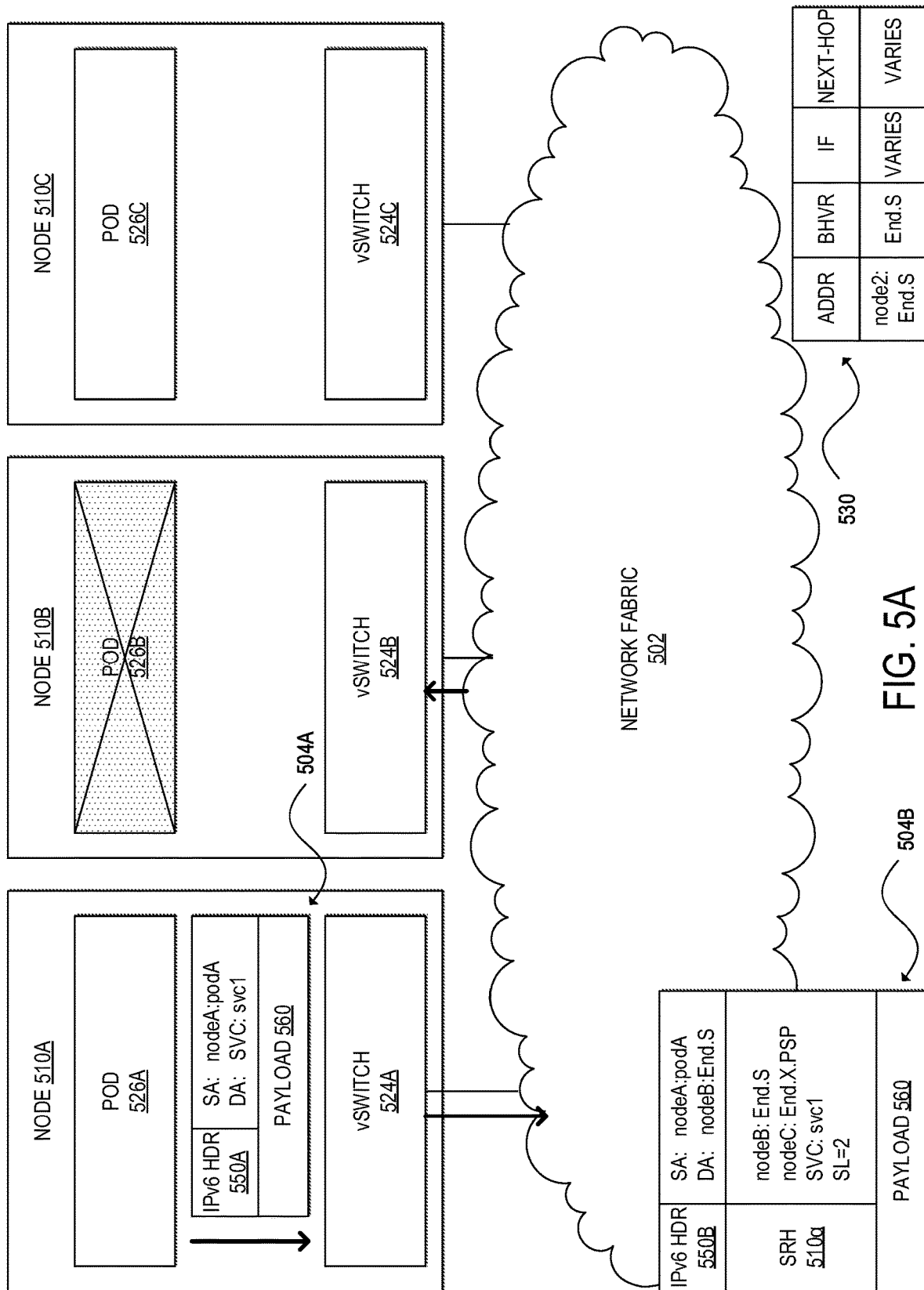

SEGMENT ROUTING WITH FAST REROUTE FOR CONTAINER NETWORKING

CROSS-REFERENCE TO RELATED APPLICATION

This application is a continuation and claims priority to, U.S. Non-Provisional patent application Ser. No. 16/138,595, filed on Sep. 21, 2018, the full disclosure of which is hereby expressly incorporated by reference in its entirety.

TECHNICAL FIELD

The subject matter of this disclosure relates in general to the field of telecommunications networks, and more particularly, to systems and methods for segment routing with fast reroute in a container network.

BACKGROUND

Network operators are increasingly deploying containers for developing software in continuous integration and continuous delivery (CI/CD) environments and running distributed applications and microservices in private networks, public clouds, or both (e.g., hybrid clouds or multi-clouds). Containers are an example of operating-system-level virtualization. Containers can be self-contained execution environments that have their own isolated CPU, memory, input/output (I/O), and network resources and share the kernel of a host operating system. Containers can be isolated from one other and from their hosts (physical or virtual servers). For example, they can have their own file systems. They may have no visibility into each other's processes. Their computing resources (e.g., processing, storage, networking, etc.) can be bounded. Containers can be easier to build and configure than virtual machines, and because containers can be decoupled from their underlying infrastructure and from host file systems, they can be highly portable across various clouds and operating system distributions. However, containers can introduce additional complexities for networking.

BRIEF DESCRIPTION OF THE FIGURES

To provide a more complete understanding of the present disclosure and features and advantages thereof, reference is made to the following description, taken in conjunction with the accompanying drawings, in which:

FIG. 3A and FIG. 3B illustrate examples of a segment routing packet in accordance with an embodiment;

FIGS. 5A-5D illustrate examples of segment routing with fast reroute in the event a container pod is unreachable in accordance with an embodiment;

DESCRIPTION OF EXAMPLE EMBODIMENTS

Figure 1:
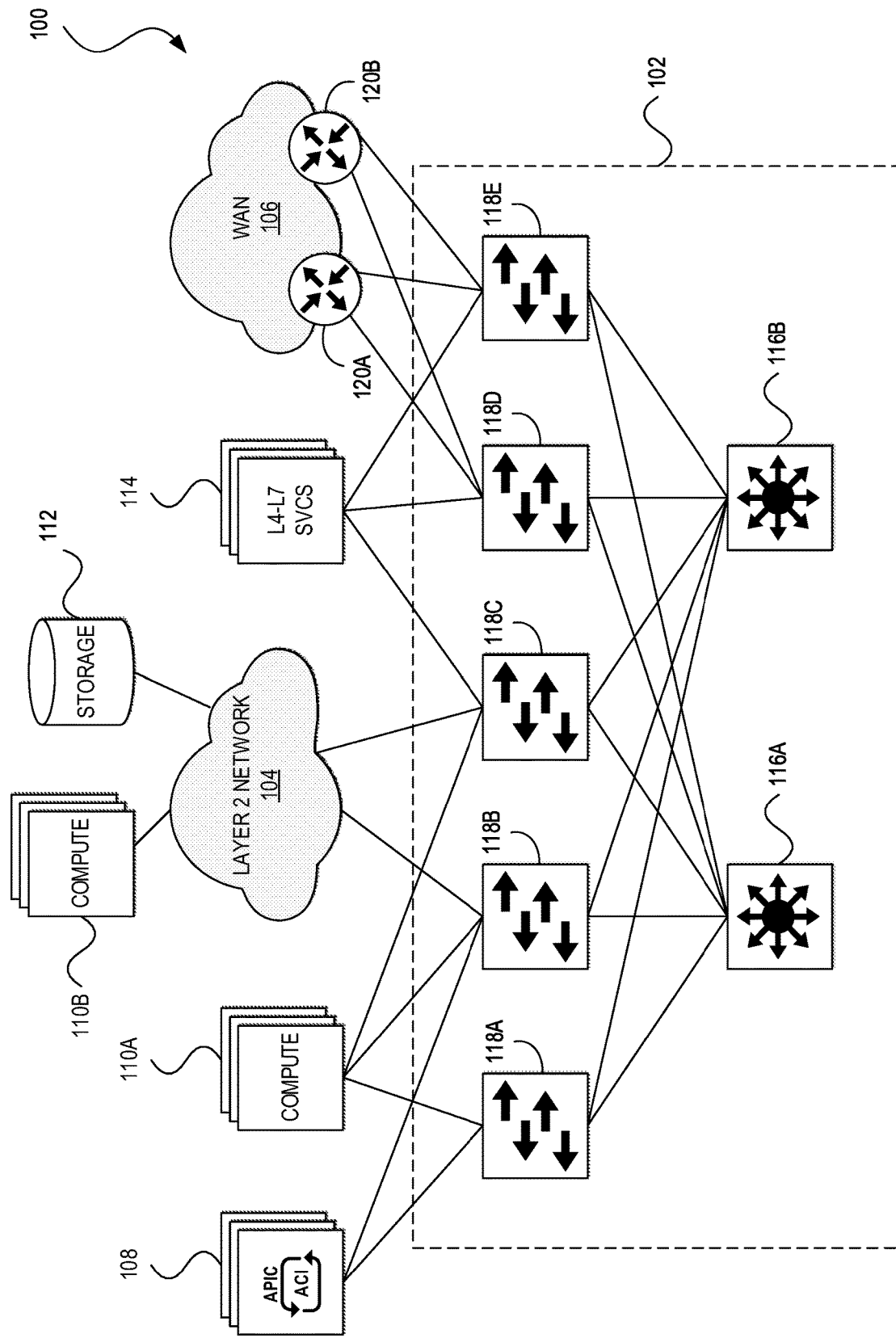
FIG. 1 illustrates an example of a network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for segment routing (SR) with fast reroute when a container or set of containers (e.g., pod) or container/pod host becomes unreachable. An SR ingress device (e.g., a physical or virtual switch, router, or host) can receive a packet (e.g., IPv6) from a first container/pod in a first host (e.g., a physical or virtual server) and destined for a container service (e.g., a cluster of containers/pods). The SR ingress device can generate an SR packet including a segment list and the original packet. The segment list can include a first segment or segment identifier (SID) to a second host including a second container/pod of the service, a second segment or SID to a third hosting including a third container/pod of the service, and a third segment or SID to the container service. The SR ingress device can forward the SR packet to a first SR egress device corresponding to the first segment or SID. The first SR egress device can determine whether the second container/pod and/or host is reachable. If so, the first SR egress device can forward the SR packet to the second host or the original packet (after de-encapsulation) to the second container/pod. If not, the first SR egress device can perform a fast reroute and forward the SR packet to a second SR egress device corresponding to the.

Example Embodiments

One way of deploying containers in a network is to utilize a container orchestration platform. A container orchestration platform can include one or more masters that may operate as the controller for containers in the network and one or more worker nodes that may carry out the network's workloads. The container orchestration platform can also support clustering of container hosts (e.g., physical or virtual servers) that may perform the same or similar functionalities (sometimes referred to as a container service). Current implementations of container networks assign a network address (e.g., ClusterIP) to each container service, and then install Network Address Translation (NAT) rules at each container host to map from the container service address to the network address of a specific container or container pod in the container host. An alternative approach can be to tunnel traffic between an ingress host to an egress host and to retain the container service address as the inner destination IP address in the tunnel. Some embodiments of the present disclosure may utilize Segment Routing over IPv6 data plane (SRv6) for the tunneling mechanism. This can provide the various benefits of segment routing, such as increased network simplification, programmability and scalability, and flexibility.

Segment routing can provide control over forwarding paths using simple network instructions. In addition, segment routing does not require additional protocols and may even remove unnecessary protocols in some deployments to further simplify a network.

Segment routing does not require path signaling such that only SR ingress devices may need to maintain per-flow state. This can increase network flexibility while reducing cost. In addition, path can be expressed uniquely as a set of segments, and there is no need for route injection. This architecture can be highly scalable since the SR-capable device may only have to store the exact paths it needs.

An SR path can be based on best effort inter-domain reachability or for Service Level Agreement (SLA) reachability. Segment routing can also be used to steer traffic along any arbitrary path in a network. This can allow network operators to enforce low-latency and/or disjoint paths, regardless of normal forwarding paths. SR can achieve this flexibility without any additional signaling or midpoint fabric-state.

Segment routing can also support fast reroute in the event a container service or container host becomes unreachable. Current implementations of a container network may be slow to detect the unavailability of a container service and/or container host and/or to reprogram the network. Various embodiments of the present disclosure can overcome these and other deficiencies of the prior art using segment routing to encode multiple segments to a container service for fast reroute to a secondary route in the event in the event the container service and/or container is unreachable along a primary route.

FIG. 1 illustrates an example of a network 100 for implementing various embodiments of the present disclosure. It should be understood that, for the network 100 and any network discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network 100 can include any number or type of resources, which can be accessed and utilized by clients or tenants. The illustrations and examples provided herein are for clarity and simplicity.

The network 100 can include a network fabric 102, a Layer 2 (L2) network 104, an L3 network 106, a network controller 108, compute resources 110A and 110B (collectively, "110"), storage resources 112, and L4-L7 services 114. The network fabric 102 can include spine switches 116A and 116B (collectively, "116") and leaf switches 118A, 118B, 118C, 118D, and 118E (collectively, "118"). The spine switches 116 can connect to the leaf switches 118 in the network fabric 102. The leaf switches 118 can include access ports (or non-fabric ports) and fabric ports. The fabric ports can provide uplinks to the spine switches 116, while the access ports can provide connectivity to endpoints (e.g., the compute resources 110, the storage resources 112, the L4-L7 services, etc.), internal networks (e.g., the L2 network 104), or external networks (e.g., the L3 network 106).

The leaf switches 118 can reside at the edge of the network fabric 102, and can thus represent the physical network edge. For instance, in some embodiments, the leaf switches 118D and 118E can operate as border leaf switches in communication with edge routers 120A and 120B located in the external network 106. The border leaf switches 118D and 118E may be used to connect any type of external network device, service (e.g., firewall, deep packet inspector, traffic monitor, load balancer, etc.), or network (e.g., the L3 network 106) to the fabric 102.

Although the network fabric 102 is illustrated and described herein as a leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. In some embodiments, the leaf switches 118 can be top-of-rack switches configured according to a top-of-rack architecture. In other embodiments, the leaf switches 118 can be aggregation switches in any particular topology, such as end-of-row or middle-of-row topologies. In some embodiments, the leaf switches 118 can also be implemented using aggregation switches.

Moreover, the topology illustrated in FIG. 1 and described herein is readily scalable and may accommodate a large number of components, as well as more complicated arrangements and configurations. For example, the network may include any number of fabrics 102, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communications in the network fabric 102 can flow through the leaf switches 118. In some embodiments, the leaf switches 118 can provide endpoints (e.g., the compute resources 110 or the storage resources 112, etc.), services (e.g., the L4-17 services 114), internal networks (e.g., the L2 network 104), or external networks (e.g., the L3 network 106) access to the network fabric 102, and can connect the leaf switches 118 to each other. In some embodiments, the leaf switches 118 can connect endpoint groups (EPGs) to the network fabric 102, internal networks (e.g., the L2 network 104), and/or any external networks (e.g., the L3 network 106). EPGs are groupings of applications, or application components, and tiers for implementing forwarding and policy logic. EPGs can allow for separation of network policy, security, and forwarding from addressing by using logical application boundaries. EPGs can be used in the network 100 for mapping applications in the network. For example, EPGs can comprise a grouping of endpoints in the network 100 indicating connectivity and policy for applications.

As discussed, the compute resources 110 can connect to the network fabric 102 via the leaf switches 118. For example, the compute resources 110A can connect directly to the leaf switches 118A and 118B, which can connect the compute resources 110A to the network fabric 102 and/or any of the other leaf switches. The compute resources 110B and storage resources 112 can connect to the leaf switches 118B and 118C via the L2 network 104. The compute resources 110B, storage resources 112, and the L2 network 104 make up a local area network (LAN). LANs can connect nodes over dedicated private communications links located in the same general physical location, such as a building or campus.

The WAN 106 can connect to the leaf switches 118D or 118E via the edge routers 120. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints can include any communication device or component, such as a computer, server, blade, hypervisor, virtual machine, container, process (e.g., running on a virtual machine), switch, router, gateway, host, device, external network, etc.

In some embodiments, the network 100 may connect to external networks of public cloud providers via the WAN 106 for additional compute, storage, and/or network resources in an architecture sometimes referred to as a hybrid cloud or multi-cloud. A hybrid cloud can include the combined compute, storage, and/or network resources of a private network or cloud (e.g., the network 100) and a public cloud to perform workloads of an operator of the network 100. A multi-cloud can combine compute, storage, and/or network resources of a private cloud with the resources of multiple public cloud providers.

In this example, the network controller 108 is implemented using the Application Policy Infrastructure Controller (APIC™) from Cisco Systems®, Inc. (Cisco®). The APIC™ can provide a centralized point of automation and management, policy programming, application deployment, and health monitoring for the fabric 102. Here, the APIC™ can operate as a replicated synchronized clustered controller. In other embodiments, other configurations or software-defined networking (SDN) platforms can be utilized for managing the fabric 102.

Compute resources 110 can comprise hosts, including physical or bare metal servers, virtual machines, and/or containers, for running applications of the operator of the network 100. In some embodiments, a physical server may have instantiated thereon a hypervisor for creating and running one or more virtual machines. Some virtual machines may host one or more containers. In other embodiments, physical servers may run a shared kernel for hosting containers (e.g., bare metal containers). In yet other embodiments, physical servers can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions.

Storage resources 112 can comprise various technologies for storing the data of the operator of the network 100. Storage media can include hard disk drives (HDDs), solid state drives (SSD), hybrid storage arrays that incorporate Flash memory and HDDs, and/or other media. The storage resources can be organized as direct attached storage (DAS), network attached storage (NAS), storage area networks (SANs), or other storage infrastructure.

The L4-L7 services 114 can provide networking services for the network 100, such as network address translation (NAT), firewalling, Internet Protocol Security (IPSec), session border control (SBC), deep packet inspection (DPI), traffic monitoring, load balancing, etc. The L4-L7 services 114 can be implemented in hardware as physical appliances and/or in software using general-purpose CPUs (e.g., virtual appliances within virtual machines and/or containers). In this example, the network controller 108 can provide automatic service insertion based on policies defined by the network operator. The controller 108 can use L4-L7 service graphs (e.g., ordered sets of service function nodes between a set of endpoints and set of network service functions specified for an application) to push the needed configuration and security policies to the fabric 102, the L4-L7 services 114, and other infrastructure components of the network 100.

As seen in FIG. 1, containers play an increasingly important role in a modern network. Containers can be used to modernize a data center by packaging existing applications into containers to improve utilization of computing resources and reduce costs. Due to their portability, containers can also simplify different cloud migration strategies, such as hybrid cloud or multi-cloud architectures. Containers can also promote modern development strategies, such as continuous integration, delivery, and deployment (CI/CD), because of their isolated nature and robustness to rapidly changing environments. In addition, containers are lightweight by design and ideal for enabling microservices, whether building new microservices, or refactoring monolithic applications into smaller services.

Figure 2:
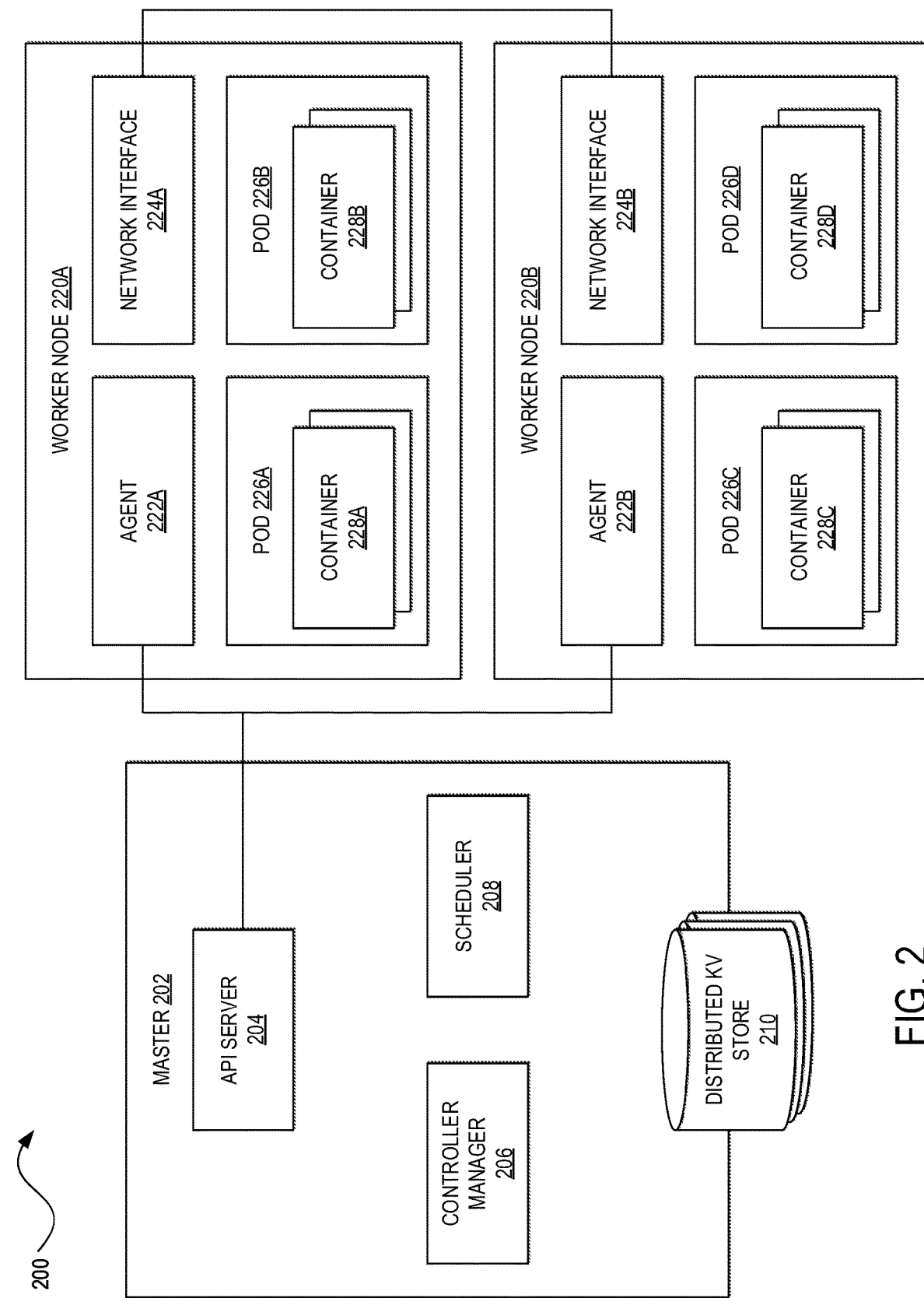
FIG. 2 illustrates an example of a container orchestration platform in accordance with an embodiment.

FIG. 2 illustrates an example of a container orchestration platform 200 for managing containers in a network (e.g., the network 100). One of ordinary skill in the art will understand that, for the container orchestration platform 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not necessarily depart from the scope of the present disclosure.

In this example, the container orchestrator platform 200 can correspond to the Kubernetes® (K8s) system from the Cloud Native Computing Foundation®. Kubernetes® is an open source container orchestration system for automating deployment, scaling, and management of application containers across clusters of hosts. However, other embodiments may deploy other container orchestration platforms, such as Docker Swarm® from Docker®, Inc., Apache Mesos® from the Apache® Software Foundation, or other container orchestrator without departing from the scope of the present disclosure.

The container orchestration platform 200 can comprise one or more clusters. A cluster is a collection of compute, storage, and networking resources that the container orchestration platform 200 can use to run the various workloads of a network. Each cluster can comprise one or more hosts (physical servers and/or virtual machines). Here, master 202 and worker nodes 220A and 220B (collectively, "220") can represent a single cluster. In this example, there is one master 202 but other embodiments may include multiple masters to provide high availability.

The master 202 can provide a control plane for a cluster. The master 202 can be responsible for the global, cluster-level scheduling of pods (set of one or more containers) and the handling of events (e.g., starting up a new pod when additional computing resources are needed). The master 202 can include an Application Programming Interface (API) server 204, a controller manager 206, a scheduler 208, and a distributed Key Value (KV) store 210. The master components can run on any host in the cluster but usually run on the same (physical or virtual) machine without worker nodes.

The API server 204 (e.g., kube-apiserver) can operate as the front-end of the control plane, and can expose the API (e.g., Kubernetes API) of the container orchestration platform 200. The API server 204 can scale horizontally (e.g., scale by deploying more instances) as it can be stateless and store data in the distributed KV store 210.

The controller manager 206 (e.g., kube-controller-manager, cloud-controller-manager) can be a collection of various managers rolled up into one binary. The controller manager 206 can include a node controller, replication controller, endpoints controller, service controller, volume controller, and others. The node controller can be responsible for noticing and responding when nodes go down. The replication controller can be responsible for maintaining the correct number of pods for every replication controller in the system. The endpoints controller can populate endpoints (e.g., pods). The service controller can be responsible for creating, updating, and deleting network services (e.g., firewalling, load balancing, deep packet inspection, etc.). The volume controller can be responsible for creating, attaching, and mounting volumes.

The scheduler 208 (e.g., kube-scheduler) can be responsible for scheduling pods into nodes. This can involve evaluation of resource requirements, service requirements, hardware/software policy constraints, node affinity and anti-affinity specifications, pod affinity and anti-affinity specifications, data locality, and deadlines, among other factors.

The distributed KV store (e.g., etcd) 210 is a high-availability distributed data store. The container orchestration platform 200 can use the distributed KV store 210 to store cluster state information. In a small, short-lived cluster, a single instance of the KV store 210 can run on the same host as other master components, but for larger clusters, the distributed KV store 210 may comprise a cluster of hosts (e.g., 3-5 nodes) for redundancy and high availability.

Worker nodes 220 can maintain running pods and provide a runtime environment (not shown) for the container orchestration platform 200. The container runtime can be responsible for running containers (e.g., Docker®, rkt from CoreOS®, Inc., runC from the Open Container Initiative™, etc.). Each of the worker nodes 220 can correspond to a single host, which can be a physical or virtual machine. Each worker node 220 can include an agent 222 (e.g., kubelet) and a network interface 224 (e.g., kube proxy, Open vSwitch (OVS)/Contiv netplugin, etc.).

The agent 222 can run on each node 220 in a cluster and ensure that containers (e.g., containers 228A, 228B, 228C, etc. (collectively, "228")) are running in a pod (e.g., pods 226A, 226B, 226C, etc. (collectively, 226)). The agent 222 can oversee communications with the master 202, including downloading secrets from the API server 204, mounting volumes, reporting the status of the node 220 and each pod 226.

A pod is the unit of work in the container orchestration platform 200. Pods can help to manage groups of closely related containers that may depend on each other and that may need to cooperate on the same host to accomplish their tasks. Each pod 226 can include one or more containers 228. Pods can be scheduled together and run on the same machine. The containers 228 in each pod 226 can have the same IP address and port space; they can communicate using localhost or standard inter-process communication. In addition, the containers 228 in each pod 226 can have access to shared local storage on the node 220 hosting the pod. The shared storage can be mounted on each container 228.

The network interface 224 can be responsible for container networking, including low-level network housekeeping on each node, reflection of local services, TCP and UDP forwarding, finding cluster IPs through environmental variables or Domain Name System (DNS). In some embodiments, the container orchestration platform 200 may employ a networking model that relates how the nodes 220, pods 226, and containers 228 interact with one another, such as ensuring that containers can communicate with other containers without NAT, nodes can communicate with containers (and vice-versa) without NAT, and the IP address that a container sees itself as is the same IP address that others see it as. This networking model can assign IP addresses at the pod level such that containers within a pod share an IP address and port space. This networking model can also enable containers within a pod to reach other containers' ports on localhost.

The container orchestration platform 200 can enable intra-node communication or pod-to-pod communication within the same node via local filesystem, any IPC mechanism, or localhost. The container orchestration platform 200 can support various approaches for inter-node communication or pod-to-pod communication across nodes, including L2 (switching), L3 (routing), and overlay networking. The L2 approach can involve attaching an L2 network to a node's physical network interface controller (NIC) and exposing the pod directly to the underlying physical network without port mapping. Bridge mode can be used to enable pods to interconnect internally so that traffic does not leave a host unless necessary. The L3 approach may not use overlays in the data plane, and pod-to-pod communication can happen over IP addresses leveraging routing decisions made by node hosts and external network routers. Pod-to-pod communication can utilize Border Gateway Protocol (BGP) peering to not leave the host, and NAT for outgoing traffic. An overlay approach can use a virtual network that may be decoupled from the underlying physical network using tunneling technology (e.g., Virtual Extensible LAN (VXLAN), Generic Routing Encapsulation (GRE), Segment Routing (SR), etc.). Pods in the virtual network can find each other via tunneling. In addition, L2 networks can be isolated from one another, and L3 routing can be utilized for inter-node pod-to-pod communication.

In some embodiments, the container orchestration platform 200 can support labels and selectors. Labels are key-value pairs that can be used to group together sets of objects, such as pods. Labels can also be used to specify attributes of objects that may be meaningful and relevant to network users. There can be an N×N relationship between objects and labels. Each object can have multiple labels, and each label may be applied to different objects. Each label on an object may have a unique key. The label key can include a prefix and a name. The prefix can be optional. If the prefix exists, it can be separated from the name by a forward slash (/) and be a valid DNS subdomain. The prefix and the name can have specified maximum lengths (e.g., 253 and 63 characters, respectively). Names can start and end with an alphanumeric character (a-z, A-Z, 0-9) and include alphanumeric characters, dots, dashes, and underscores in between. Values can follow the same restrictions as names.

Label selectors can be used to select objects based on their labels, and may include equality-based selectors and set-based selectors. Equality (and inequality) based selectors can allow for selection of objects by key name or value. Matching objects must satisfy specified equality (= or ==) or inequality (!=) operators. Set-based selectors can enable selection of objects according to a set of values, including objects that are "in" or "notin" the set or objects having a key that "exists." An empty label selector can select every object in a collection. A null label selector (which may only be possible for optional selector fields) may select no objects.

In some embodiments, the container orchestration platform 200 may support container services. A container service is an abstraction which defines a logical set of pods and a policy by which to access them. The set of pods targeted by a container service can be determined by a label selector. Services can be published or discovered through DNS or environment variables. Services can be of different types, such as a ClusterIP, NodePort, LoadBalancer, or ExternalName. A ClusterIP can expose a container service on a cluster-internal IP such that the container service may only be reachable from within the cluster. A NodePort can expose a container service on each node's IP at a static port. A ClusterIP container service, to which the NodePort container service may route, can be automatically created. The NodePort container service can be contacted from outside the cluster by requesting <NodeIP>:<NodePort>. A LoadBalancer can expose a container service externally using a cloud provider's load balancer. NodePort and ClusterIP container services, to which the external load balancer routes, may be automatically created. An ExternalName can map a container service to the contents of a specified Canonical Name (CNAME) record in the DNS.

As discussed, current implementations of the control plane in a container network may be slow to detect overloading or failure of a container pod or node and/or to reroute traffic from the overloaded or unreachable container pod or node. However, by utilizing Segment Routing (SR), source SR devices (e.g., physical or virtual switches, routers, or hosts, etc.) can encode multiple SR routes or policies to forward traffic and enable immediate re-routing of the traffic in the event of overloading or failure of a container pod or node.

Segment Routing is a source routing architecture in which a source chooses a path or route (also sometimes referred to as an SR Policy) and encodes it in a packet header as an ordered list of instructions referred to as segments. Segments can represent any instruction in a topology or service. For example, packets can be forwarded along the shortest path from the source along a first segment to a first segment endpoint (e.g., a physical or virtual switch, router, or host), then through the shortest path from the first segment endpoint along a second segment to a second segment endpoint, and so on. SR has been implemented for at least two data planes: Multiprotocol Label Switching (MPLS) and IPv6. Segment Routing over IPv6 data plane (SRv6) can be realized through the Segment Routing Header (SRH).

FIG. 3A illustrates an example of an SRH 320 within an SRv6 packet 300. The SRv6 packet 300 can also include a payload 360 and an IPv6 header 350. The SRH 320 can include a Next Header 322, a Header Extension Length 324, a Routing Type 326, a Segments Left 328, a Last Entry 330, Flags 332, a Tag 334, a Hash-based Message Authentication Code (HMAC) 336, and a Segment List 340. The Next Header 322 can identify the type of header immediately following the SRH 320. The Header Extension Length 324 can indicate the length of the SRH 320. The Routing Type 326 can identify a particular Routing header variant. The Segments Left 328 can indicate the number of route segments remaining (e.g., the number of explicitly listed intermediate SRv6-capable devices still to be visited before reaching the final destination). The Last Entry 330 can indicate the index of the last element of the Segment List 340. The Flags 332 can include packet metadata, such as a cleanup flag for stripping the SRH 320 from a packet and other metadata. The Tag 334 can label a packet as a part of a class or group of packets (e.g., packets sharing the same set of properties). The HMAC information 336 can be optional, and may include a type (e.g., 1 octet), length (e.g., 1 octet), reserved bits (e.g., 2 octets), HMAC Key ID (e.g., 4 octets), and HMAC (e.g., 32 octets).

The Segment List 340 can comprise a set of SRv6 segments 342A . . . 342N (collectively, "342"). The SRv6 segments 342 are sometimes referred to by their Segment Identifiers (SIDs). The SRv6 segments 342 can comprise 128 bit values representing a topological instruction (e.g., node or link traversal) or an operator-defined instruction (e.g., virtual function). The Segment List 340 can be encoded starting from the last segment of the SR route or policy. That is, the first element of the Segment List (Segment List [0]) may correspond to the last segment of the SR route or policy, the second element (Segment List [1]) may correspond to the penultimate segment of the SR route or policy, and so on. The Segment List 340 can be used to steer packets through paths with given properties (e.g., bandwidth or latency) and through various network functions (e.g., firewall, load balancer, IPSec, etc.).

When an SRv6-capable device (e.g., physical or virtual switch, router, or server) adds the SRH 320 to a packet, the packet can be encapsulated by an outer IPv6 header (e.g., the IPv6 header 350) and the SRH 320, and the original packet can be left unmodified as the payload 360. This SRv6-capable device may be referred to as the SR ingress device. A Destination Address 354 of the outer IPv6 header 350 can be set to the first segment or SID 342, and the packet may be forwarded to the corresponding segment endpoint following the shortest path. The segment endpoint can process the packet by updating the Destination Address 354 to the next segment and decrementing the Segments Left 328. The segment endpoint of the penultimate segment of the Segment List 340 may be referred to as the SR egress device or segment endpoint. The SR egress device or segment endpoint can de-encapsulate the inner packet (e.g., the payload 360) and forward the packet to its final destination.

In some embodiments, direct or inline SRH insertion may be used instead of encapsulation. In direct or inline SRH insertion, the SRH 320 can be inserted directly immediately after the IPv6 header 350. This can result in less overhead than encapsulation but may be more susceptible to disruptions in the event of network errors. For example, an Internet Control Message Protocol (ICMP) message generated for a packet modified by direct or inline SRH insertion can reach the original source of the packet but may not be aware of the inserted SRH.

The IPv6 header 350 can include a Source Address 352 and the Destination Address 354. The Source Address 352 can identify the source of the packet 300. As discussed, the Destination Address 354 can identify the next segment or node from the Segment List 340. The Destination Address 354 in the IPv6 header 350 can allow the packet 300 to be routed even if the packet 300 traverses devices that do not support SRv6. The Destination Address 354 can include a network prefix of the identified segment endpoint or segment. This can ensure that the packet 300 is transmitted to that segment endpoint or segment. After the packet 300 is processed by a segment endpoint, the segment endpoint can forward the packet 300 to the next segment in the Segment List 340. When forwarding the packet, the segment endpoint can overwrite the Destination Address 354 on the IPv6 header 350 to identify the next segment endpoint or segment. The next segment endpoint can then receive the packet 300 based on the Destination Address 354. In this manner, the Segment List 340 in the SRH 320 and the Destination Address 354 in the IPv6 header 350 can be used to push the packet 300 to its final destination.

In addition to forwarding addresses, the Destination Address 354 and/or Segment List 340 can include functions or commands ("SR functions") to be executed by associated segment endpoints or segments. SR functions can encode actions to be taken by a segment endpoint directly in a segment 342 of the Segment List 340 and/or the IPv6 header 350. SR functions may be executed locally by SRv6-capable devices.

FIG. 3B illustrates how SR functions may be encoded within the DA 354 or segment 342. The most significant bits of the encoding can make up a locator 344 for routing a packet to a particular segment endpoint. The least significant bits can make up an SR function 346 to be performed by the segment, and, if any, arguments 348 (e.g., 32 bits) for the function. The number of bits allocated for the locator 344, SR function 346, and arguments 348 may be locally determined by each segment endpoint. For example, one segment endpoint may allocate 80 bits for the locator 344, 16 bits for the function 346, and 32 bits for the arguments 348. Another segment endpoint may allocate 64 bits for the locator 344, 32 bits for the function 346, and 32 bits for the arguments 348.

Table 1 sets forth an example set of SR functions. However, one of ordinary skill will understand that this set of functions is not exhaustive. For instance, any function can be attached to a local SID because an SRv6-capable device can bind an SID to a local virtual machine or container which can apply any complex function on the packet.

TABLE 1

Example Segment Routing Functions

| Name | Function |
| --- | --- |
| End | Endpoint function (SRv6 instantiation of a prefix SID) |
| End.X | Endpoint function with Layer-3 cross-connect (SRv6 instantiation of an Adjacency SID) |
| End.T | Endpoint function with specific IPv6 table lookup |
| End.PSP | Penultimate Segment Pop of the SRH |
| End.X.PSP | |
| End.T.PSP | |
| End.USP | Ultimate Segment Pop of the SRH |
| End.X.USP | |
| End.T.USP | |
| End.DX2 | Endpoint with decapsulation and Layer-2 cross-connect (L2VPN use-case) |
| End.DX2V | Endpoint with decapsulation and VLAN L2 table lookup (EVPN Flexible cross-connect use-cases) |
| End.DT2U | Endpoint with decaps and unicast MAC L2 table lookup (EVPN Bridging unicast use-cases) |
| End.DT2M | Endpoint with decapsulation and L2 table flooding (EVPN Bridging BUM use-cases with ESI filtering) |
| End.DX6 | Endpoint with decapsulation and IPv6 cross-connect (IPv6 L3VPN use; equivalent of a per-CE VPN label)) |

TABLE 1-continued

Example Segment Routing Functions

| Name | Function |
| --- | --- |
| End.DX4 | Endpoint with decapsulation and IPv4 cross-connect (IPv4 L3VPN use; equivalent of a per-CE VPN label) |
| End.DT6 | Endpoint with decapsulation and IPv6 table lookup (IPv6 L3VPN use; equivalent of a per-VRF VPN label) |
| End.DT4 | Endpoint with decapsulation and IPv4 table lookup (IPv4 L3VPN use; equivalent of a per-VRF VPN label) |
| End.DT46 | Endpoint with decapsulation and IP table lookup (IP L3VPN use; equivalent of a per-VRF VPN label) |
| End.B6 | Endpoint bound to an SRv6 policy (SRv6 instantiation of a Binding SID) |
| End.B6.Encaps | Endpoint bound to an SRv6 encapsulation Policy (SRv6 instantiation of a Binding SID) |
| End.BM | Endpoint bound to an SR-MPLS Policy (SRv6/SR-MPLS instantiation of a Binding SID) |
| End.R | Endpoint in search of an SID in table T |
| End.S | Endpoint in search of a target in table T |
| End.AS | SR-unaware application via static proxy |
| End.AM | SR-unaware application via masquerading |
| T | Transit behavior |
| T.Insert | Transit behavior with insertion of an SRv6 policy |
| T.Insert.Red | Transit behavior with reduced insert of an SRv6 policy |
| T.Encaps | Transit behavior with encapsulation in an SRv6 policy |
| T.Encaps.Red | Transit behavior with reduced encaps in an SRv6 policy |
| T.Encaps.L2 | T.Encaps behavior of the received L2 frame |
| T.Encaps.L2.Red | Transit with reduce encaps of received L2 frame |

FIGS. 4A-4D illustrate an example of an IPv6 packet traversing a network fabric 402 (e.g., the network fabric 102 of FIG. 1) and how SRv6 can be used for source routing the packet. One of ordinary skill will understood that, for any processes discussed herein, there can be additional, fewer, or alternative steps performed in similar or alternative orders, or in parallel, within the scope of the various embodiments unless otherwise stated.

Figure 4A:
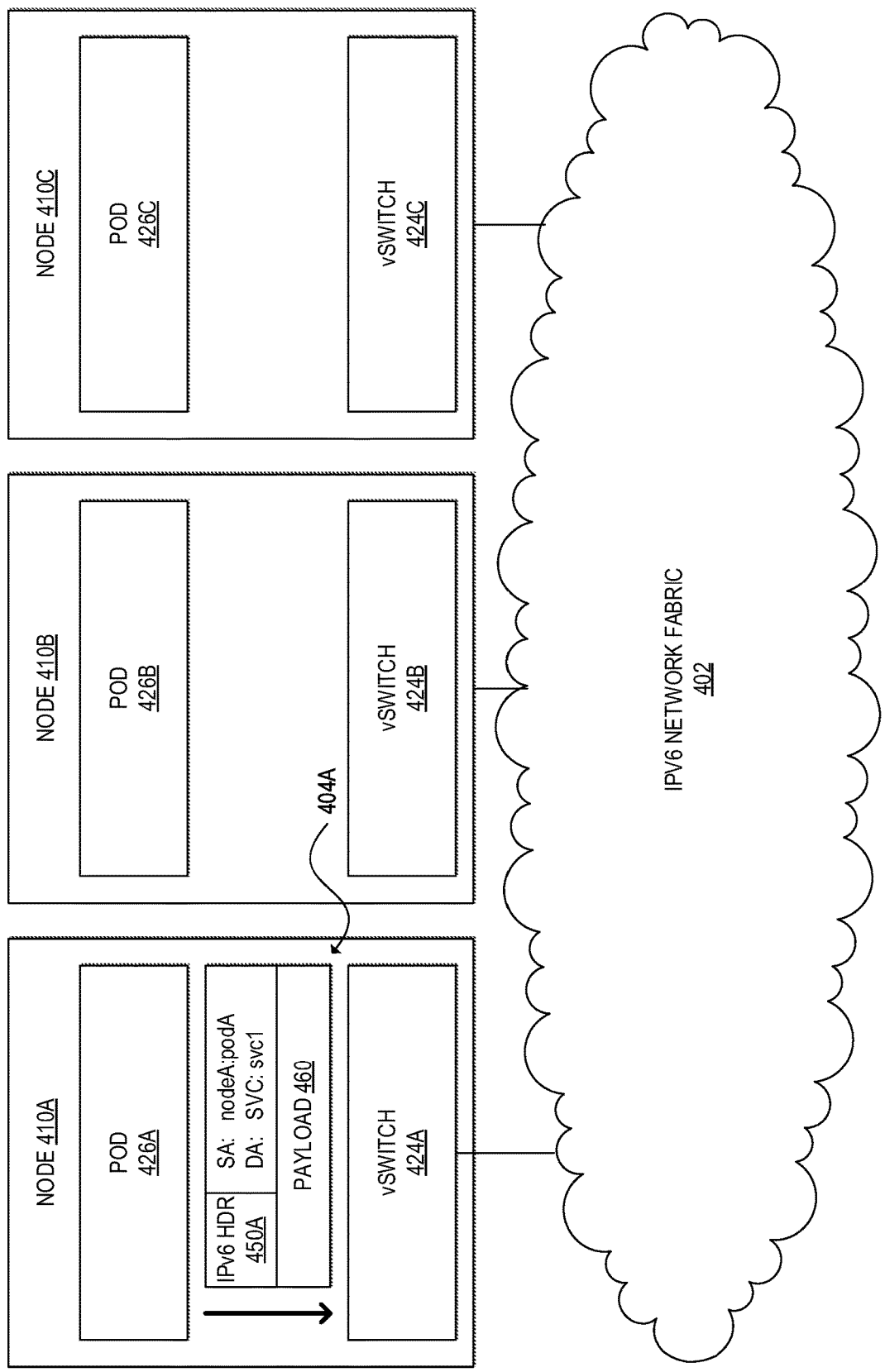
FIGS. 4A-4D illustrate examples of segment routing in accordance with an embodiment.

FIG. 4A shows an initial state of IPv6 packet 404A generated by a container pod 426A (e.g., the container pods 226 of FIG. 2) within a node 410A (e.g., the compute resources 110 of FIG. 1 or the worker nodes 220 of FIG. 2) that is intended for transmission to a container service labeled SVC:svc1. The packet 404A can include an IPv6 header 450A (e.g., the IPv6 header 350 of FIG. 3) having a Source Address (SA) corresponding to the node 410A and the pod 426A (e.g., nodeA:podA) and a Destination Address (DA) corresponding to the container service labeled SVC: svc1. The packet 404A can also include a payload 460 (e.g., the payload 360 of FIG. 3). The container pod 426A can transmit the packet 404A to a vSwitch 424A (e.g., the network interfaces 224 of FIG. 2) of the node 410A.

In this example, vSwitches 424A, 424B, and 424C (collectively, "424") can be SRv6-capable devices. Network devices (not shown) in the network fabric 102 may or may not be SRv6-capable devices. Network devices that do not support SRv6 may be referred to as non-SR transit devices (e.g., devices that forward an IPv6 packet where the DA of that packet is not locally configured as a segment nor a local interface). Non-SR transit devices do not need to be capable of processing a segment nor SRH.

In some embodiments, a network can utilize binding segments or Binding SIDs (BSIDs) for segment routing. A BSID can be bound to an SR Policy, instantiation of which may involve a list of SIDs. Packets received by SRv6-capable devices with an active segment equal to the BSID can be steered onto the bound SR Policy. Use of a BSID can instantiate the policy (the SID list) on the SR-capable devices that need to impose the policy. Thus, direction of traffic to an SR-capable device supporting the policy may only require imposition of the BSID. If the policy changes, this can also mean that only the SR-capable devices imposing the policy may need to be updated.

A BSID may be either a local SID or a global SID. If the BSID is local, the BSID can be allocated from an SR Local Block (SRLB). The SRLB is a local property of an SRv6-capable device. If the SRv6-capable device participates in multiple SR domains, there can be one SRLB for each SR domain. The SRLB can comprise a set of local IPv6 addresses reserved for local SRv6 SIDs.

An SR domain can include the set of SRv6-capable devices participating in the source-based routing model. These devices may be connected to the same physical infrastructure (e.g., a service provider's network). These devices may also be connected to each other remotely (e.g., via an enterprise Virtual Private Network (VPN) or overlay network). If multiple protocol instances are deployed, the SR domain can include all of the protocol instances in the network. However, some deployments may subdivide the network into multiple SR domains, each of which can include one or more protocol instances.

If the BSID is global, the BSID can be allocated from an SR Global Block (SRGB). The SRGB is the set of global segments in the SR Domain. If an SRv6-capable device participates in multiple SR domains, there can be one SRGB for each SR domain. The SRGB can include the set of global SRv6 SIDs in the SR Domain.

SRv6 can support various types of control planes for associating SRv6-capable devices with BSIDs, including distributed, centralized, or hybrid control planes. In a distributed scenario, the segments can be allocated and signaled by routing protocols such as Intermediate System to Intermediate System (IS-IS), Open Shortest Path First (OSPF), Border Gateway Protocol (BGP), etc. An SR-capable device can individually decide to steer packets on a source-routed policy, and the SR-capable device can individually compute the source-routed policy.

In a centralized scenario, the segments can be allocated and instantiated by one or more SR controllers (e.g., the network controller 108 of FIG. 1). The SR controller(s) can decide which SR-capable devices need to steer which packets on which source-routed policies, and the SR controller(s) can compute the source-routed policies. The SR controller(s) can use various technologies for programming the network, such as Network Configuration Protocol (NETCONF), Path Computation Element Protocol (PCEP), and BGP, among others. The SR controller(s) can discover which SIDs are instantiated at which SR-capable devices and which sets of local labels (e.g., stored in the SRLB) and global labels (e.g., stored in the SRGB) are available at which SR-capable device.

A hybrid scenario can complement a base distributed control plane with one or more centralized controllers. For example, when the destination is outside an Interior Gateway Protocol (IGP) domain, SR controller(s) may compute a source-routed policy on behalf of an IGP device. In addition, as hosts can also be part of an SR domain, the SR controller(s) can inform hosts about policies by pushing these policies to the hosts or responding to requests from the hosts.

Figure 4B:
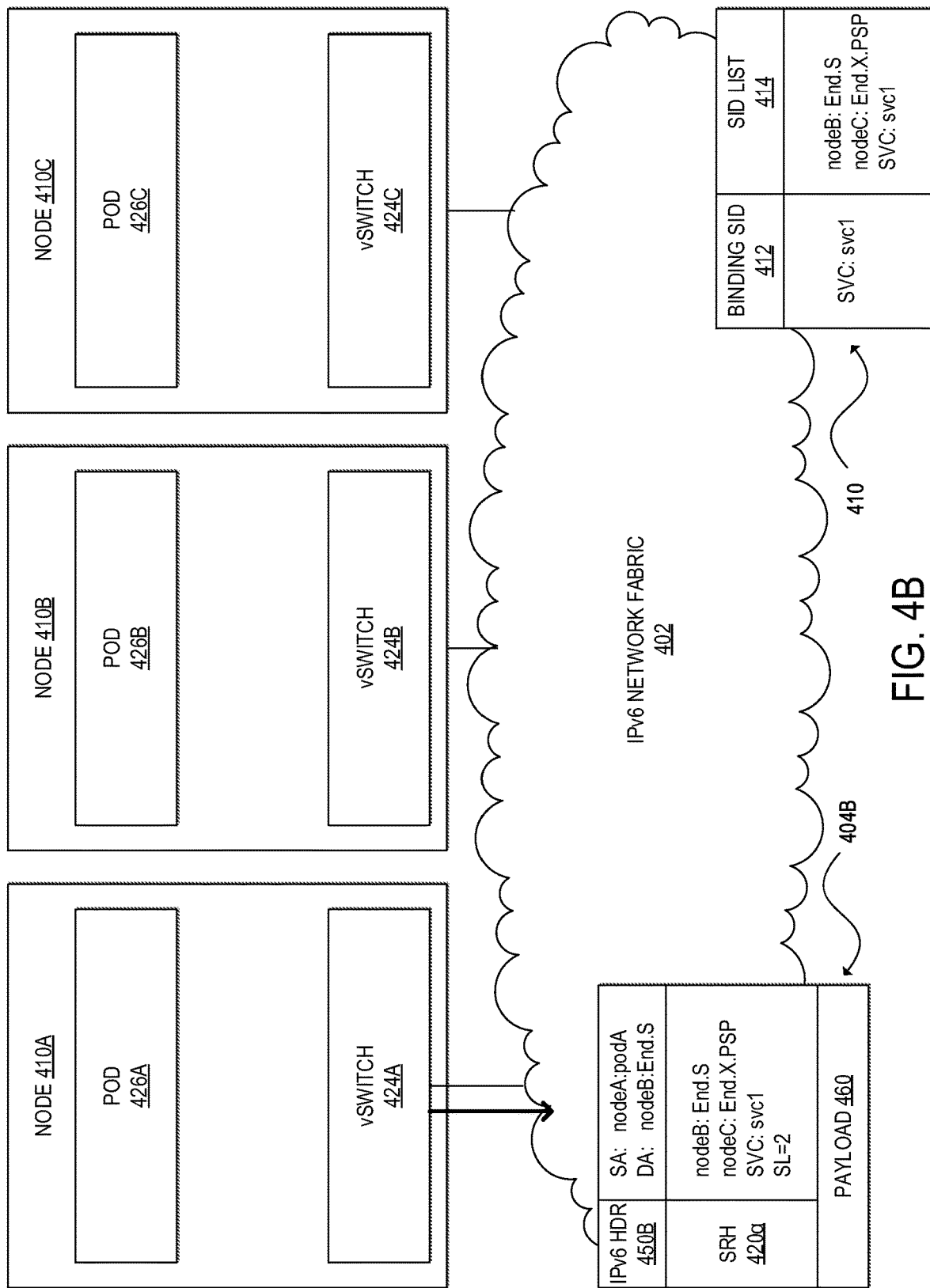

FIG. 4B shows an SR Policy 410 associated with the vSwitch 424A for providing Fast Reroute (FRR) in the event of a failure or overloading of a container pod or node. The SR Policy 410 can include a BSID 412 binding the container service SVC:svc1 to a Segment List 414. As discussed, the SR Policy 410 can be associated with the vSwitch 424A in various ways, such as by a distributed model using routing protocols (e.g., IS-IS, OSPF, BGP, etc.), one or more centralized network controllers (e.g., the network controller 108 of FIG. 1), or a hybrid approach.

The Segment List 414 can include segments or SIDs nodeB:End.S, nodeC: End.X.PSP, and SVC:svc1. The first segment or SID, nodeB:End.S, can represent a primary SR path or route to the container service SVC:svc1; the second segment or SID, nodeC:End.X.PSP; can represent a secondary SR path or route to the container service SVC:svc1; and the third segment or SID, SVC:svc1, can represent the intended destination. The first segment or SID may include a locator (e.g., the locator 344 of FIG. 3B), nodeB, and a function (e.g., the function 346 of FIG. 3B), End.S. The End. S function can involve determining whether the last SID in a Segment List is reachable. For example, a segment endpoint executing the End.S function can search for whether there is an entry in a local SID table (also sometimes referred to as a Forwarding Information Base (FIB)) for the last SID. If so, the segment endpoint can de-encapsulate the packet and forward onto the last SID. If not, the segment endpoint can perform SRH processing on the next SID. Table 2 sets forth an example of an implementation of the End. S function.

TABLE 2

Pseudo-code for the Endpoint in search of a target in table T function (End.S)

| | |
|---|---|
| 1. | IF NH=SRH and SL=0 |
| 2. | drop the packet |
| 3. | ELSE IF match(last SID) in specified table T |
| 4. | de-encapsulate |
| 5. | IPv6 forward |
| 6. | ELSE |
| 7. | process the next SID |
| 8. | END IF |

The second segment or SID includes a locator, nodeC, and a function, End.X.PSP. The End.X function can involve decrementing a Segments Left field (e.g., the Segments Left 328), updating the DA in the IPv6 header with the active segment or SID (e.g., SRH[SL]), and forwarding onto the interface or next hop corresponding to the active segment or SID. The Penultimate Segment Pop (PSP) variant of the End.X function can involve popping the SRH. Table 3 sets forth an example of an implementation of the End.X function, and Table 4 sets forth an example of an implementation for the PSP variant. Additional example implementations of other SR functions can be found in Clarence Filsfils et al., "SRv6 Network Programming." Internet-Draft draft-filsfils-spring-srv6-network-programming-05, Internet Engineering Task Force, July 2018, which is fully incorporated herein by reference.

TABLE 3

Pseudo-code for the Endpoint with Layer-3
cross-connection (End.X) function

1. IF NH=SRH and SL > 0
2.    decrement SL
3.    update the IPv6 DA with SRH[SL]
4.    forward to layer-3 adjacency bound to the SID S
5. ELSE
6.    drop the packet
7. END IF

TABLE 4

Pseudo-Code for PSP variant of the
End, End.X, and End.T functions

After the instruction 'update the IPv6 DA with SRH[SL]' is
executed, the following instructions can be added:

1. IF updated SL = 0
2.    de-encapsulate
3.    IPv6 forward
4. END IF

In the example of FIG. 4B, the vSwitch 424A can operate as the SR ingress device. Upon receiving the IPv6 packet 404A (as shown in FIG. 4A), the vSwitch 424A can search an SID table (e.g., SRLB or SRGB) for the original DA (e.g., SVC:svc1), match the original DA to the BSID 412, and insert an SRH 420α including the Segment List 414 and a value of 2 for the Segments Left field (e.g., SL=2). As discussed, the vSwitch 424A can encapsulate the packet 404A with an outside IPv6 header 450B and the SRH 420α, and leave the packet unmodified as the payload 460. Alternatively, the vSwitch 424A can insert the SRH 420α inline between the IPv6 header 450B and the payload 460. In addition, the vSwitch 424A can set the DA in the IPv6 header 450B to the first segment or SID of the Segment List 414 (e.g., nodeB:End.S). The state of the packet after SR processing by the vSwitch 424A is shown as SRv6 packet 404B. The vSwitch 424A can forward the packet 404B onto the first segment or SID.

Figure 4C:
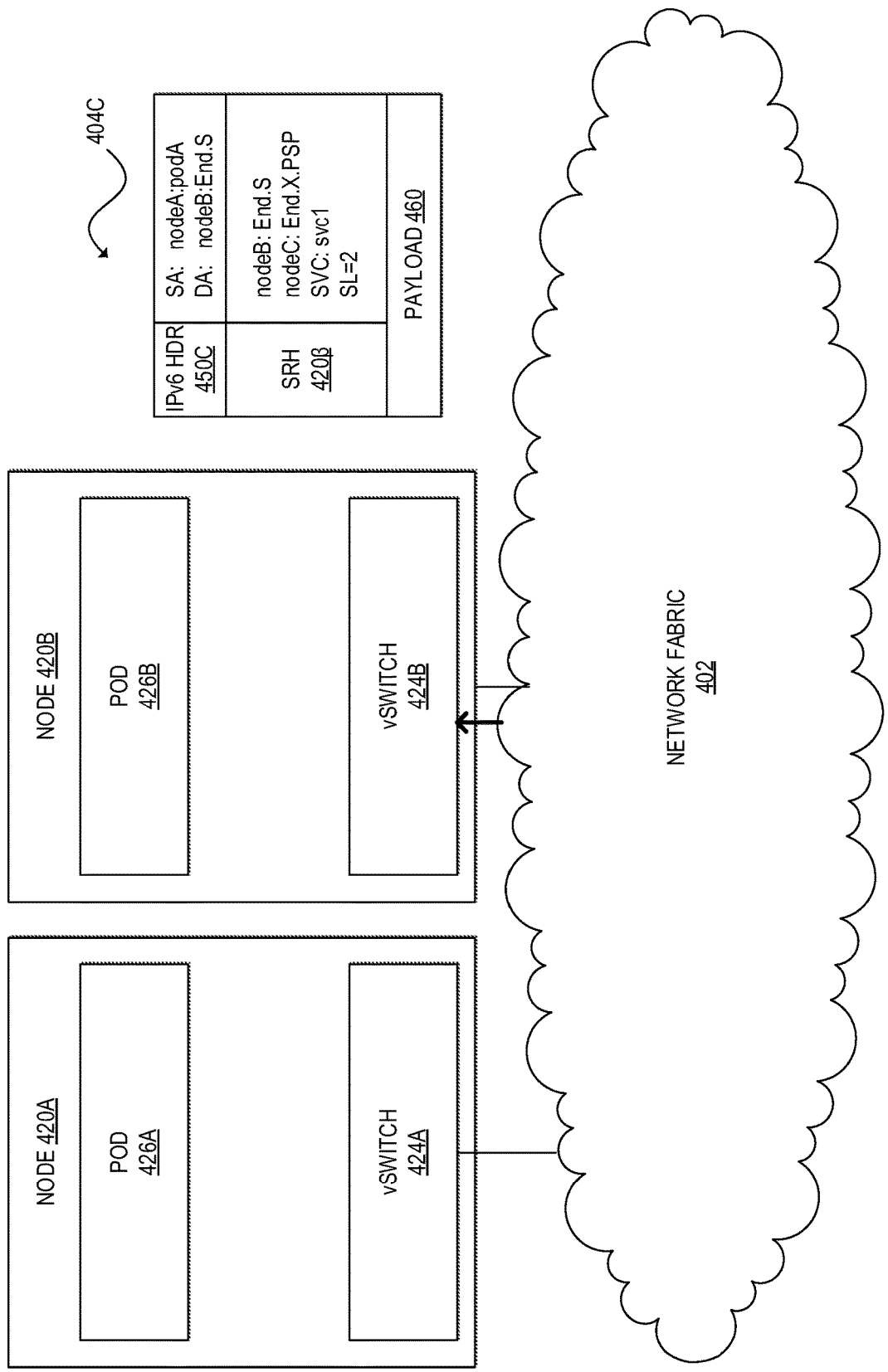

FIG. 4C shows the state of the SRv6 packet 404C after traversing the network fabric 402 and before the vSwitch 424B of the node 420B receives it. As discussed, networking devices (not shown) in the network fabric 402 do not necessarily need to support SRv6 and can use the DA of the IPv6 header 450C to forward the packet and leave it unchanged, as shown in packet 404C. If these networking devices do support SRv6 but are traversed because, for example, they form the shortest path to a segment endpoint, they may be referred to as SR transit devices. SRv6 supports various routing algorithms, including Shortest Past First, Strictest Shortest Past First, among numerous others. If these devices do not support SRv6, they may be referred to as non-SR transit devices.

Figure 4D:
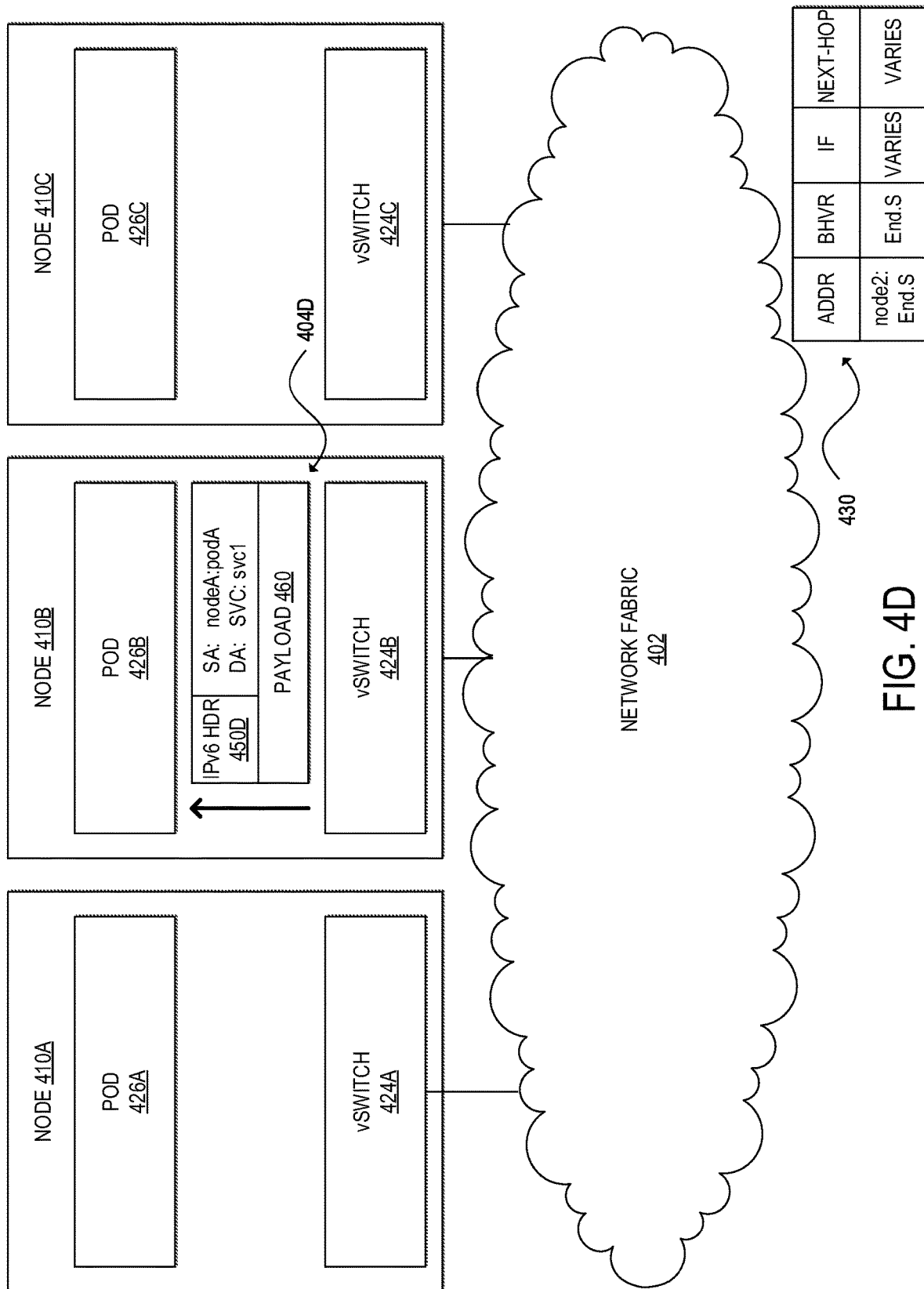

FIG. 4D shows a local SID table 430 for the vSwitch 424B. Upon receiving the packet 404C (as shown in FIG. 4C), the vSwitch 424B can perform the End.S function (an example of an implementation of which is set forth in Table 2) and determine that there is an entry in its FIB for the last segment or SID (e.g., SVC:svc1) and that the container pod 426B is reachable within the node 410B. The vSwitch 424B can either de-encapsulate the SRv6 packet (e.g., remove the outer IPv6 and SR headers) and forward the de-encapsulated packet to the container pod 426B or remove the SR header, update the DA of the IPv6 header 450D to the last segment or SID, and forward the IPv6 packet to the container pod 426B. The state of the packet after SR processing by the vSwitch 424B is shown as IPv6 packet 404D.

Figure 5B:
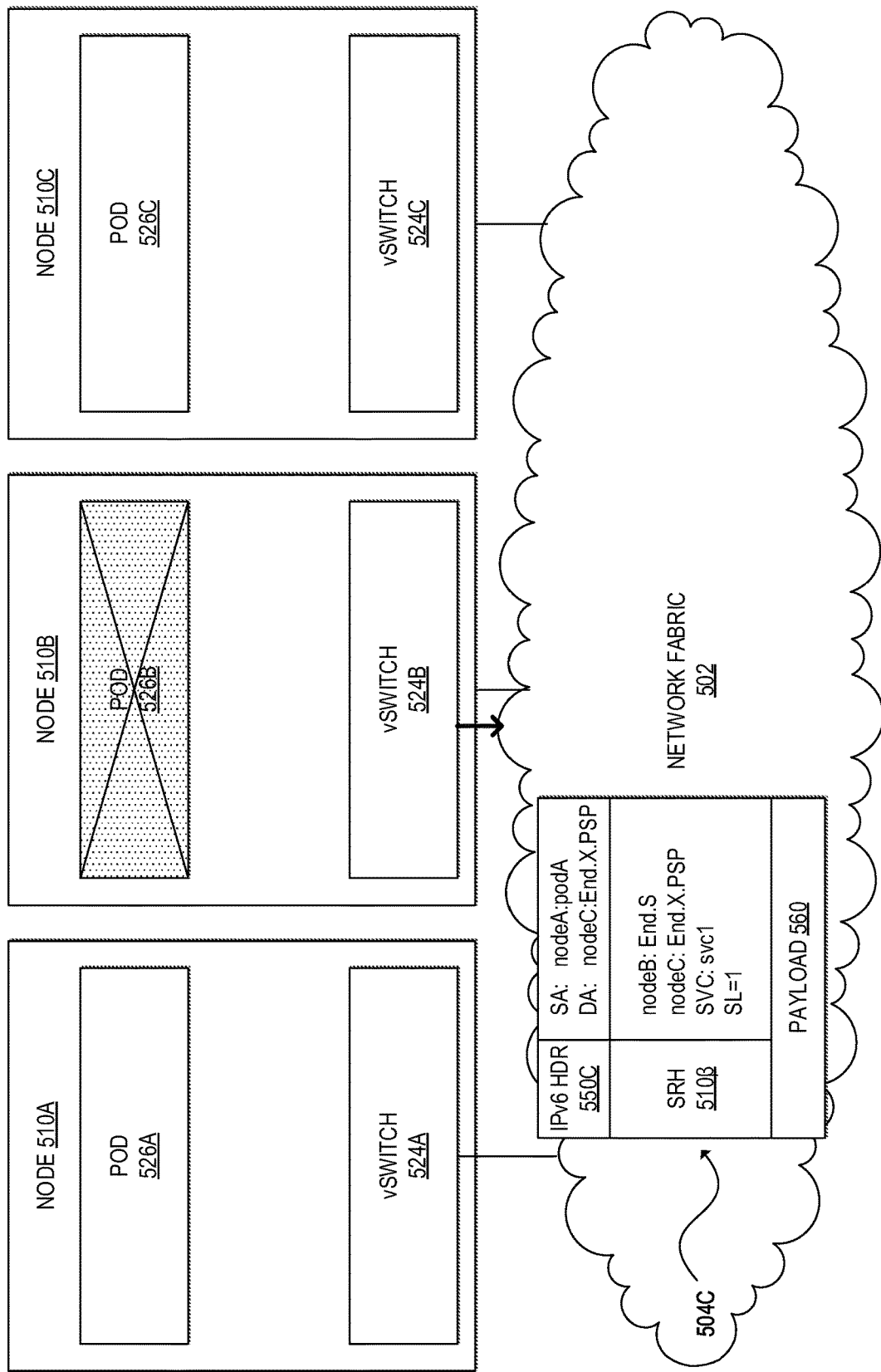

FIGS. 5A-5D illustrate an example of an IPv6 packet traversing a network fabric 502 (e.g., the network fabric 102 of FIG. 1) and how SRv6 can be used for fast reroute of the packet in the event of a failure or overloading of a container pod or node. FIG. 5A shows a first state of IPv6 packet 504A and a second state of the packet, encoded as SRv6 packet 504B, after transmission from a container pod 526A (e.g., the container pods 226 of FIG. 2) of a node 510A (e.g., the compute resources 110 of FIG. 1 or the worker nodes 220 of FIG. 2) to the network fabric 502 via a virtual switch 524A (e.g., the networking interfaces 224 of FIG. 2) of the node 510A and just before the packet arrives at a virtual switch 524B of a node 510B. The current state of the packet may be similar to the state of the packet 404C of FIG. 4C. For example, the SRv6 packet 504B can include an IPv6 header 550B having an SA corresponding to the node 510A and container pod 526A (e.g., nodeA:podA) and a DA including a locator (e.g., the locator 344 of FIG. 3B) corresponding to the node 510B (e.g., nodeB) and a function (e.g., the function 346 of FIG. 3B) End.S. The SRv6 packet 504B can also include an SRH 520α (e.g., the SRH 320 of FIG. 3A) having a Segment List (e.g., the Segment List 340 of FIG. 3A) comprising segments or SIDs (e.g., the segments 342 of FIGS. 3A and 3B) nodeB:End.S, nodeC:End.X.PSP, and SVC:svc1, and a value of 2 for Segments Left (e.g., the Segments Left 328 of FIG. 3A). In addition, the SRv6 packet 504B can include a payload 560 (e.g., the payload 360 of FIG. 3), which can be an unmodified IPv6 packet if the packet has been encapsulated or an IPv6 payload if direct or inline insertion has been applied to the packet. FIG. 5A also shows a local SID table 530 for the vSwitch 524B with an entry for nodeB:End.S.

However, in this example and unlike the example of FIGS. 4A-4D, a container pod 526B of the node 510B has failed, is overloaded, or is otherwise unreachable. Thus, upon the vSwitch 524B receiving the SRv6 packet 504B and initiating the End.S function (an example of an implementation of which is set forth in Table 2), the vSwitch 524B may fail to match the last segment or SID (e.g., SVC:svc1) to an entry in its FIB. As a result, the vSwitch 524B can perform an FRR on the SRv6 packet 504B (e.g., process the next segment or SID, nodeC:End.X.PSP). That is, upon detecting that the pod 526B is unreachable, the vSwitch 524B can immediately reroute the packet 504B to a secondary path or route.

FIG. 5B shows a state of SRv6 packet 504C after the vSwitch 524B performs the FRR/End.X.PSP function on the packet. For example, the vSwitch 524B can decrement the value of the Segments Left (SL) in the SRH 520β from 2 to 1. In addition, the vSwitch 524B can update the DA in the IPv6 header 550C to be the next segment in the Segment List of the SRH 520β from nodeB:End.S to nodeC:End.X.PSP. Finally, the vSwitch 524B can perform a FIB lookup on the updated DA and forward the packet 504C according to the matched entry. In some embodiments, the ingress SR device (e.g., the vSwitch 524A) can also be reprogrammed to reflect the unavailability of the container pod 526B, such as to update its Segment List to include one or more different segments or SIDs (e.g., a new primary route or path and, optionally, one or more new secondary routes or paths).

Figure 5C:
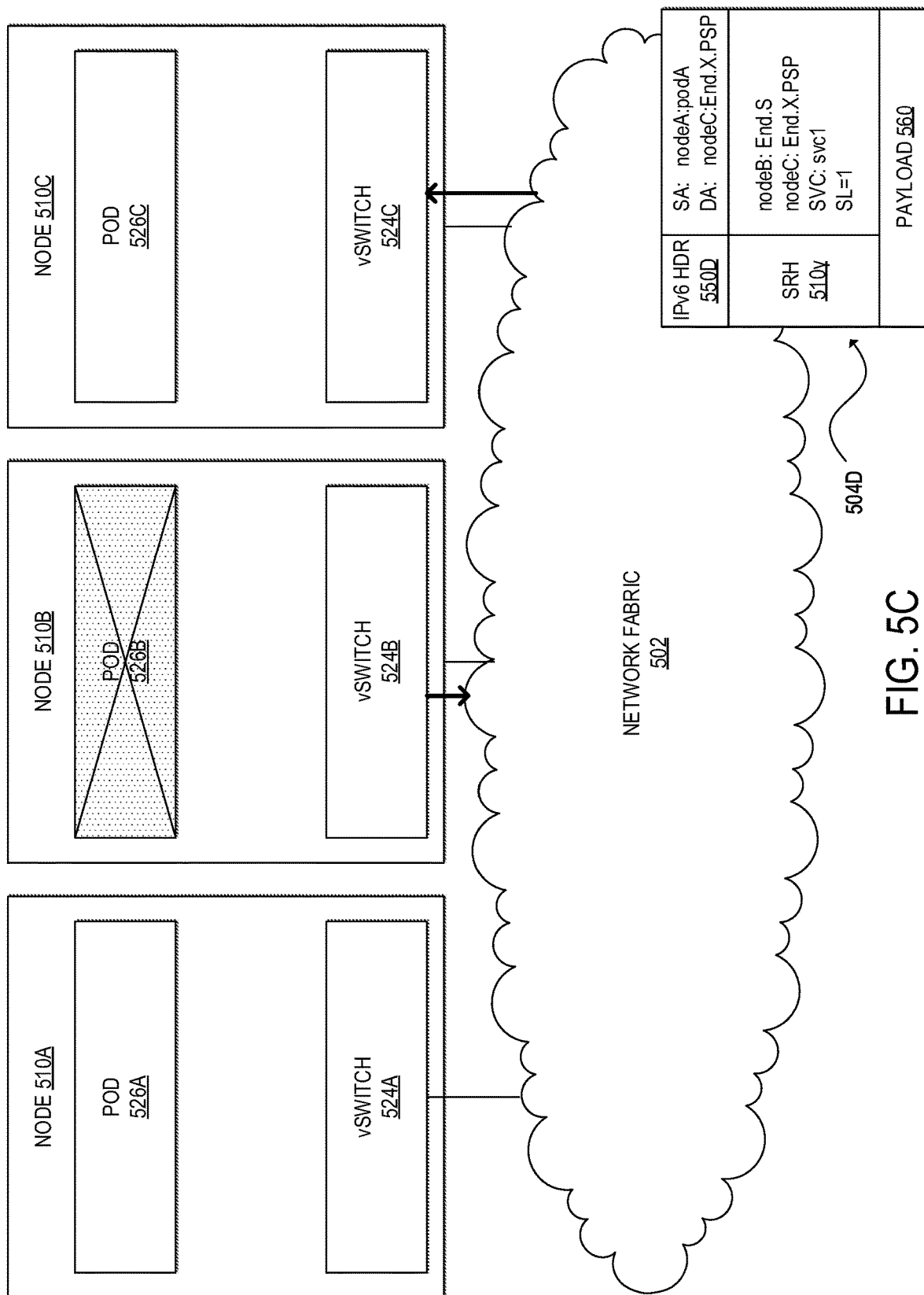

FIG. 5C shows a state of SRv6 packet 504D after the packet has traversed the network fabric 502 and right before a vSwitch 524C of a node 510C receives the packet. As discussed, the network fabric 502 does not necessarily need to support SRv6 and instead rely on the DA in IPv6 header 550D to forward the packet to the vSwitch 524C. As such, the state of SRv6 packet 504D can remain unchanged.

Figure 5D:
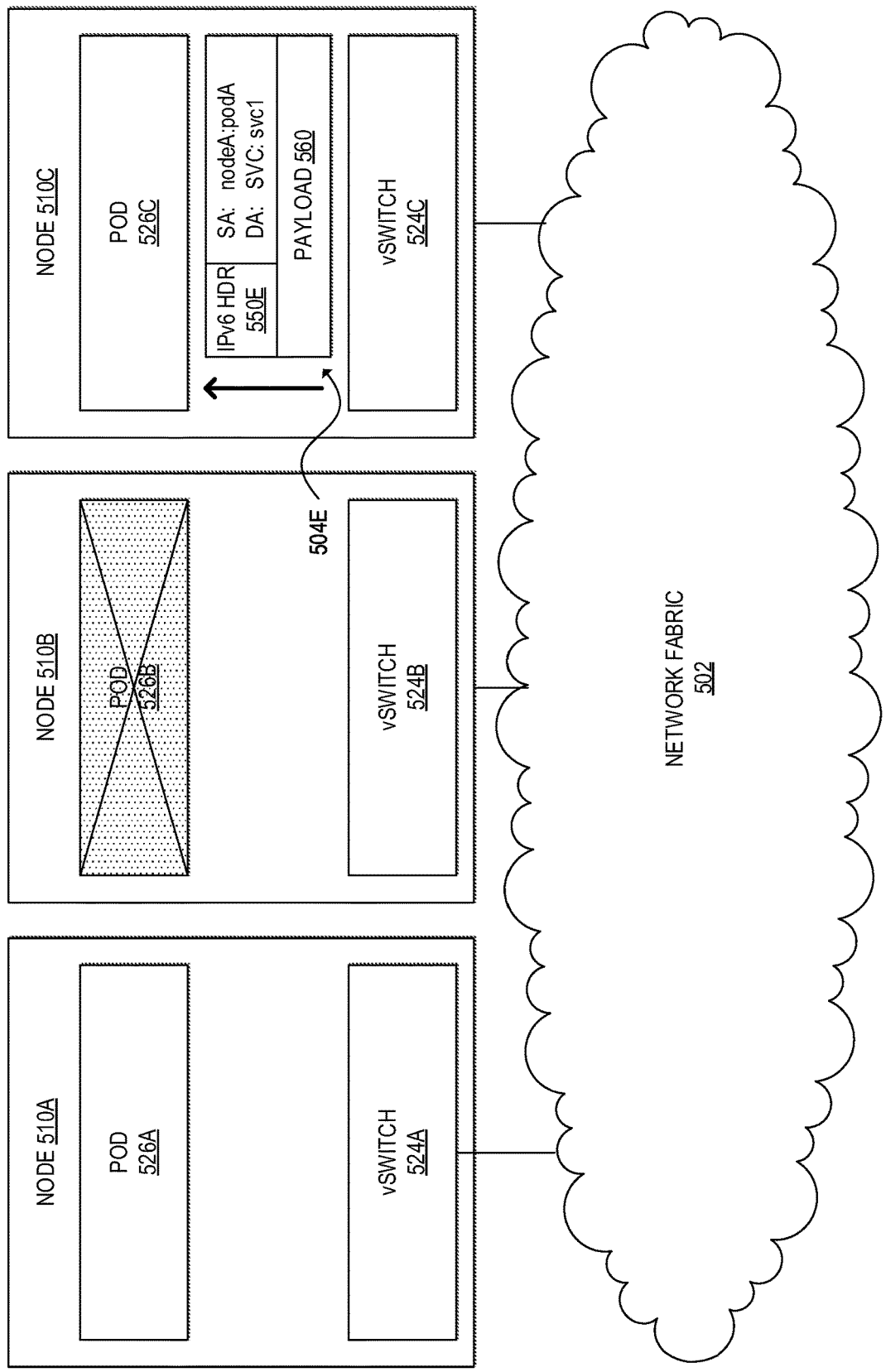

FIG. 5D shows a state of IPv6 packet 504E after SR processing by the vSwitch 524C. This can involve performing the End.X.PSP function (e.g., examples of implementations of which are set forth in Tables 3 and 4) on the packet. For example, the vSwitch 524C can decrement the Segments List from 1 to 0, pop the outer IPv6 header and SRH (if the packet was encapsulated) or update the DA of an IPv6 header to SVC:svc1 and pop the SRH (if direct or inline insertion was applied to the packet), and perform IPv6 processing on the packet (e.g., forward to an interface or next-hop corresponding to the container pod 526C).

Figure 6A:
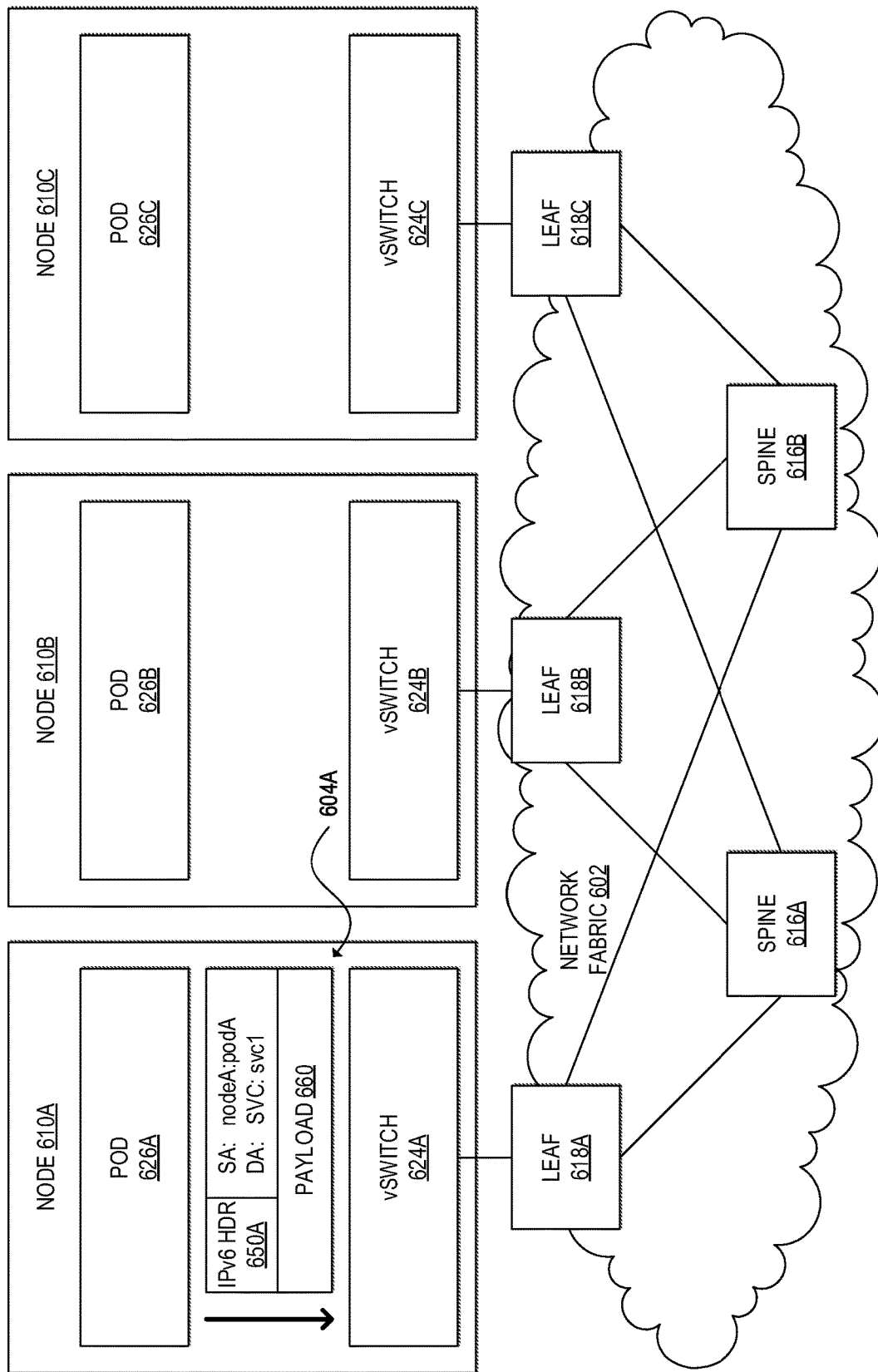
FIGS. 6A-6F illustrate examples of segment routing in accordance with an embodiment.

FIGS. 6A-6F illustrate an example of an IPv6 packet traversing a network fabric 602 (e.g., the network fabric 102 of FIG. 1) and how SRv6 can be used for source routing the packet. FIG. 6A shows an initial state of IPv6 packet 604A generated by a container pod 626A (e.g., the container pods 226 of FIG. 2) within a node 610A (e.g., the compute resources 110 of FIG. 1 or the worker nodes 220 of FIG. 2) that is intended for transmission to a service labeled SVC:svc1. The packet 604A can include an IPv6 header 650A (e.g., the IPv6 header 350 of FIG. 3) having a Source Address (SA) corresponding to the node 610A and the pod 626A (e.g., nodeA:podA) and a Destination Address (DA) corresponding to the service labeled SVC:svc1. The packet 604A can also include a payload 660 (e.g., the payload 360 of FIG. 3). The pod 626A can transmit the packet 604A to a vSwitch 624A (e.g., the network interfaces 224 of FIG. 2) of the node 610A.

In this example, vSwitches 624A, 624B, and 624C (collectively, "624") and leaf switches 618A, 618B, and 618C (collectively, "618") (e.g., the leaf switches 118 in FIG. 1) in the network fabric 602 can be SRv6-capable devices. Spine switches 616A and 616B (collectively, "616") (e.g., the spine switches 116 in FIG. 1) may or may not be SRv6-capable devices.

Figure 6B:
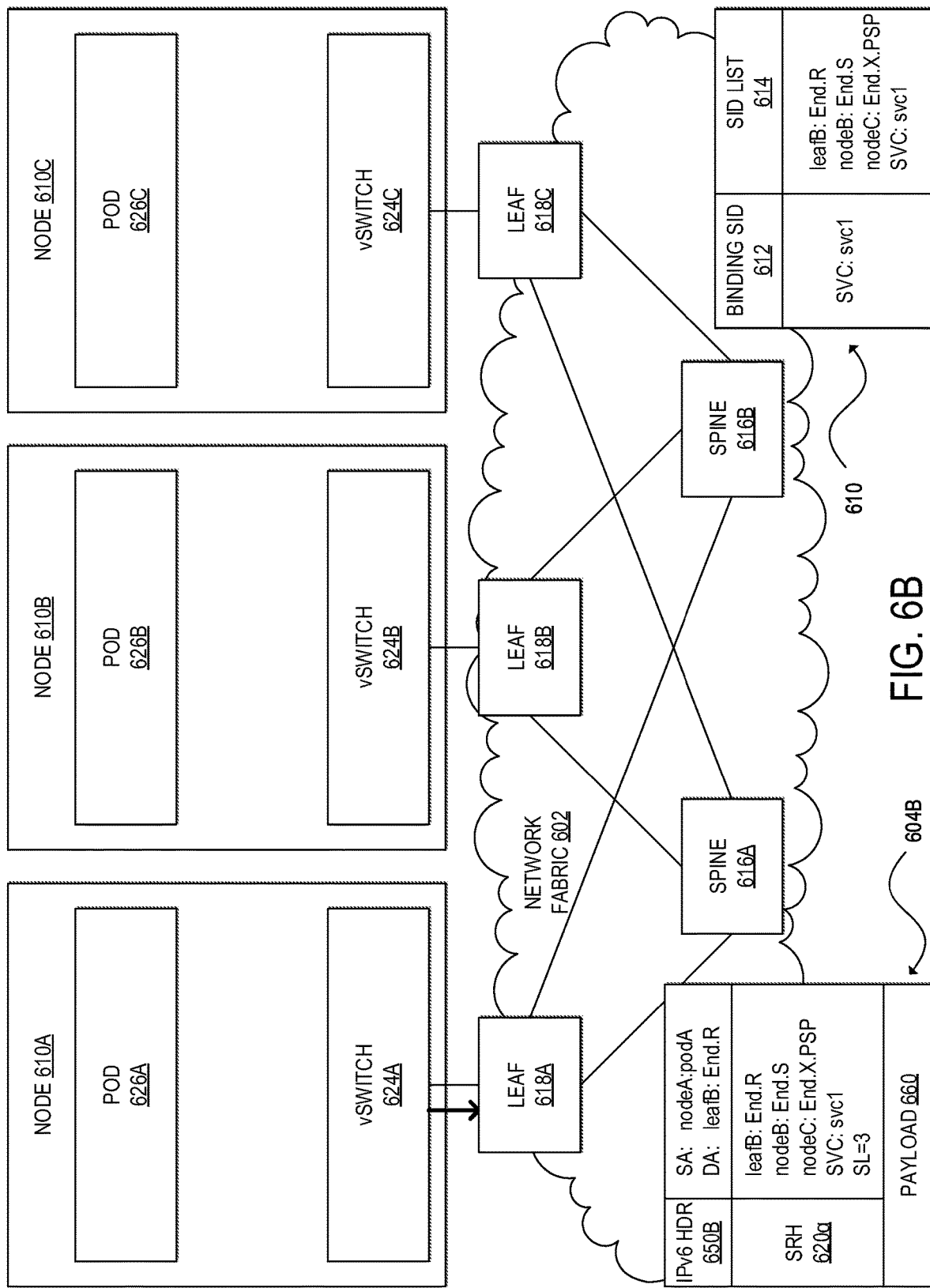

FIG. 6B shows an SR Policy 610 associated with the vSwitch 624A for providing FRR in the event of a failure or overloading of a container pod or node. The SR Policy 610 can include a BSID 612 binding the label SVC:svc1 to a Segment List 614. As discussed, the SR Policy 610 can be associated with the vSwitch 624A in various ways, such as by a distributed model using routing protocols (e.g., IS-IS, OSPF, BGP, etc.), one or more centralized network controllers (e.g., the network controller 108 of FIG. 1), or a hybrid approach.

The Segment List 614 can include segments or SIDs leafB: End.R, nodeB:End.S, nodeC: End.X.PSP, and SVC:svc1. The first segment may include a locator (e.g., the locator 344 of FIG. 3B), leafB, and a function (e.g., the function 346 of FIG. 3B), End.R. The End.R function can involve determining whether the next segment in the Segment List is reachable. If so, the packet can be processed per the usual SR processing (e.g., decrementing Segments Left, updating the DA, and forwarding the packet). If not, the Segments Left can be decreased by 2, the DA can be updated to be the new active segment (e.g., SRH[SL]), and the packet can be forwarded according to the updated DA. Table 5 sets forth an example of an implementation for the End.R function.

TABLE 5

Pseudo-code for the Endpoint in search of an SID in table T function (End.R)

| | |
|---|---|
| 1. | IF NH=SRH and SL < 1 |
| 2. | drop the packet |
| 3. | ELSE IF match (next SID) in specified table T |
| 4. | decrement SL |
| 5. | update the IPv6 DA with SRH[SL] |
| 6. | FIB lookup on the updated DA |
| 7. | forward according to the matched entry |
| 8. | ELSE |
| 9. | decrease SL by 2 |
| 10. | update the IPv6 DA with SRH[SL] |
| 11. | FIB lookup on the updated DA |
| 12. | forward according to the matched entry |
| 13. | END IF |

In FIG. 6B, the second segment or SID of the Segment List 614 can include a locator, nodeB, and a function, End.S. Table 2 sets forth an example of an implementation of the End.S function. The third segment or SID can include a locator, nodeC, and a function, End.X.PSP. Table 3 sets forth an example of an implementation of the End.X function, and Table 4 sets forth an example of an implementation for the PSP variant. The fourth segment or SID can include a label, locator, or IPv6 address corresponding to SVC:svc1.

In this example, the vSwitch 624A can operate as the SR ingress device. After receiving the IPv6 packet 604A (as shown in FIG. 6A), the vSwitch 624A may search an SID table (e.g., SRLB or SRGB) for the original DA (e.g., SVC:svc1), match the original DA to the BSD 612, and insert an SRH 620α including the Segment List 614 and a value of 3 for the Segments Left field (e.g., SL=3). As discussed, the vSwitch 624A can encapsulate the packet 604A with an outside IPv6 header 650B and the SRH 620α, and leave the packet unmodified as the payload 660. Alternatively, the vSwitch 624A can insert the SRH 620α inline between the IPv6 header 650B and the payload 660. In addition, the vSwitch 624A can set the DA in the IPv6 header 650B to the first segment or SID of the Segment List 614 (e.g., learn:End.R). The state of the packet after SR processing by the vSwitch 624A is shown as SRv6 packet 604B. The vSwitch 624A can forward the packet 604B along the shortest path to the leaf switch 618B.

Figure 6C:
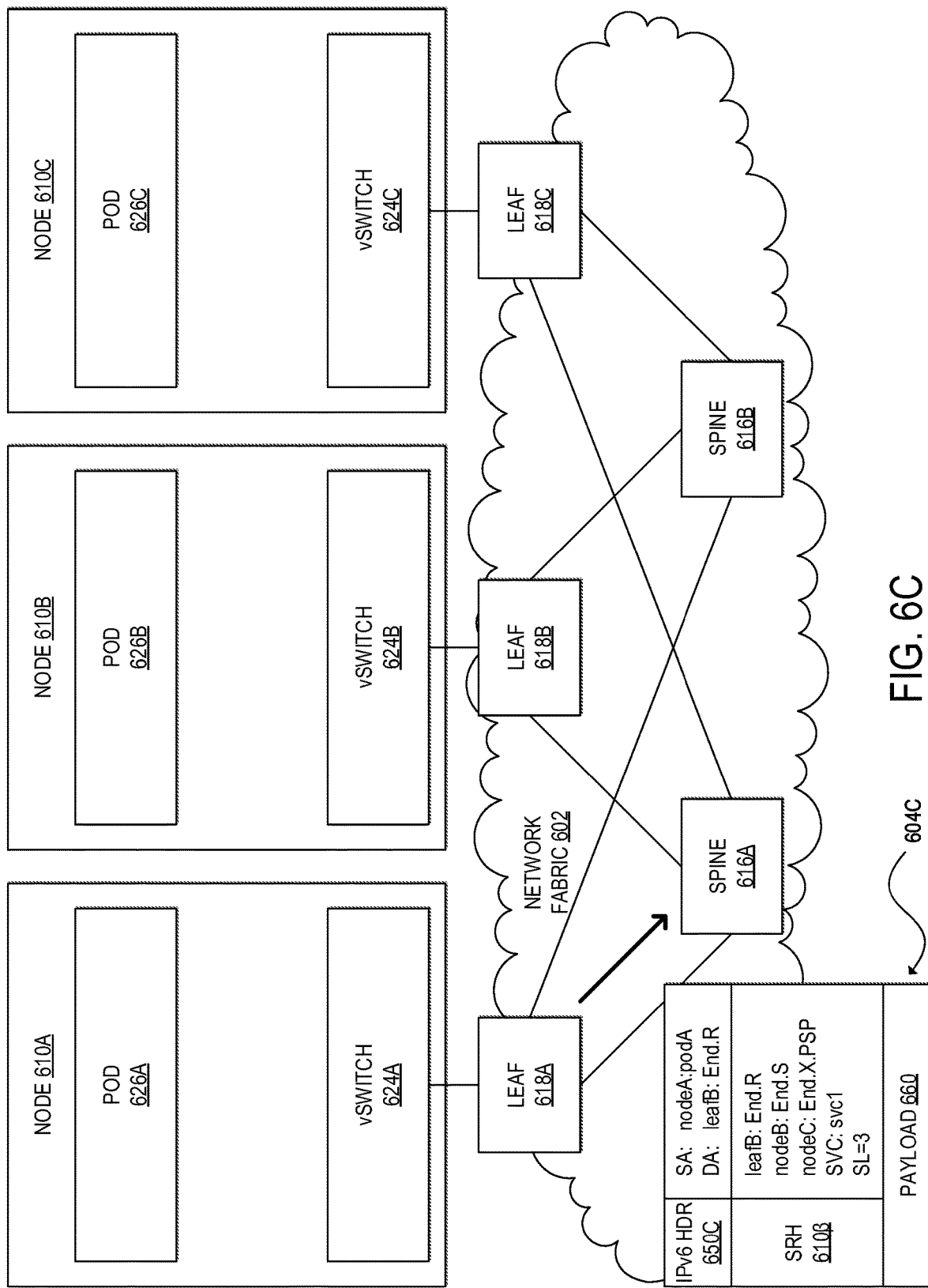

FIG. 6C shows the state of SRv6 packet 604C after the leaf switch 618A has forwarded it and before the spine switch 616A receives it. Here, the leaf switch 618A can support SRv6 but may operate as an SR transit device that forms a part of the shortest path to the leaf switch 618B. The spine switches 616 in the network fabric 602 do not necessarily need to support SRv6 and can use the DA of the IPv6 header 650C to forward the packet and leave it unchanged, as shown in packet 604C. The spine switches 616 operate as non-SR transit devices if they do not support SRv6.

Figure 6D:
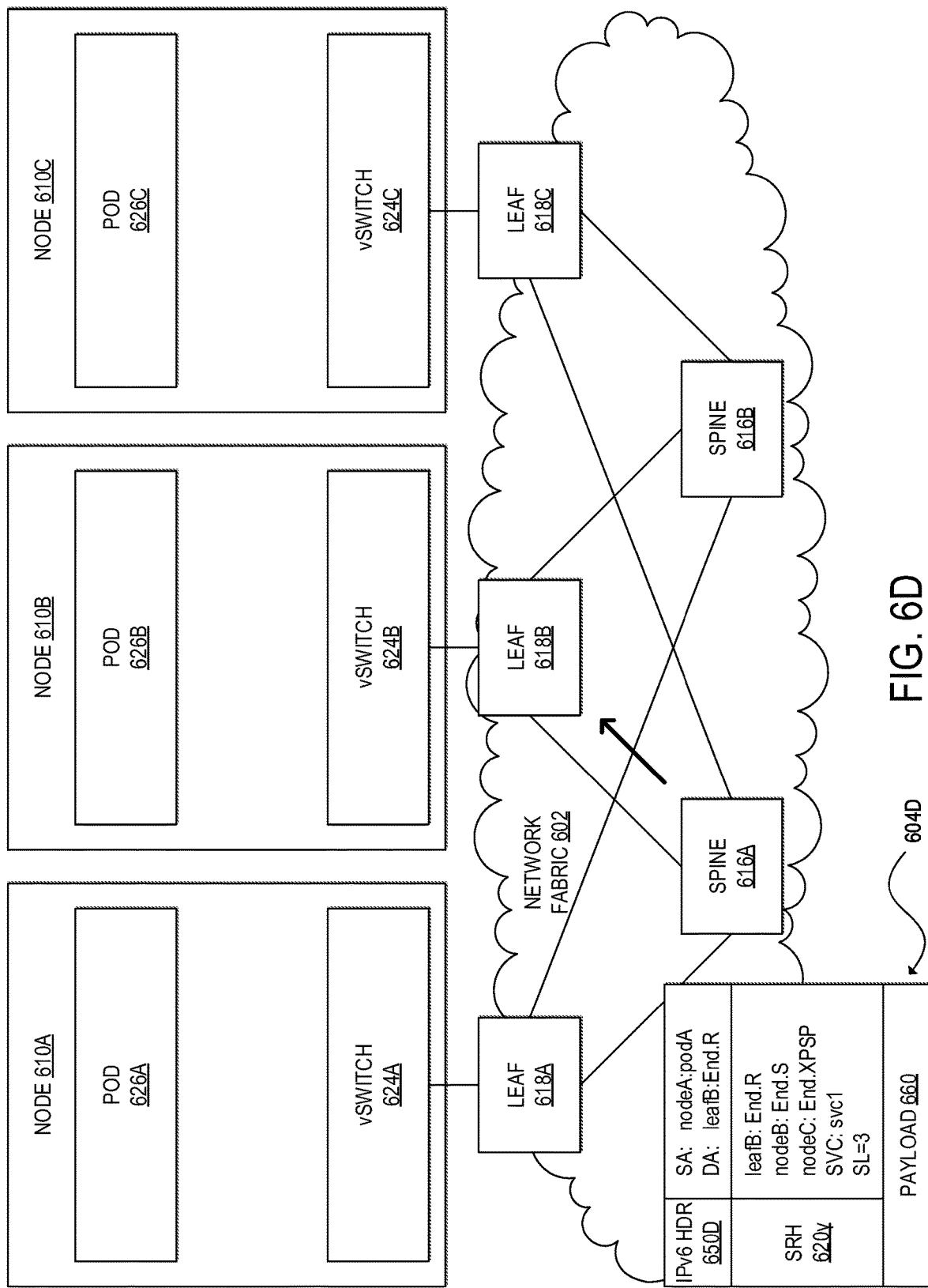

FIG. 6D shows the state of SRv6 packet 604D after the spine switch 616A has forwarded it and before the leaf switch 618B receives it. As discussed, the spine switch 616A can operate as a non-SR transit device and forward the packet 604D on the basis of the IPv6 header 650D. The spine switch 616A can ignore the SRH 620γ and leave the packet 604D unchanged from its previous state.

Figure 6E:
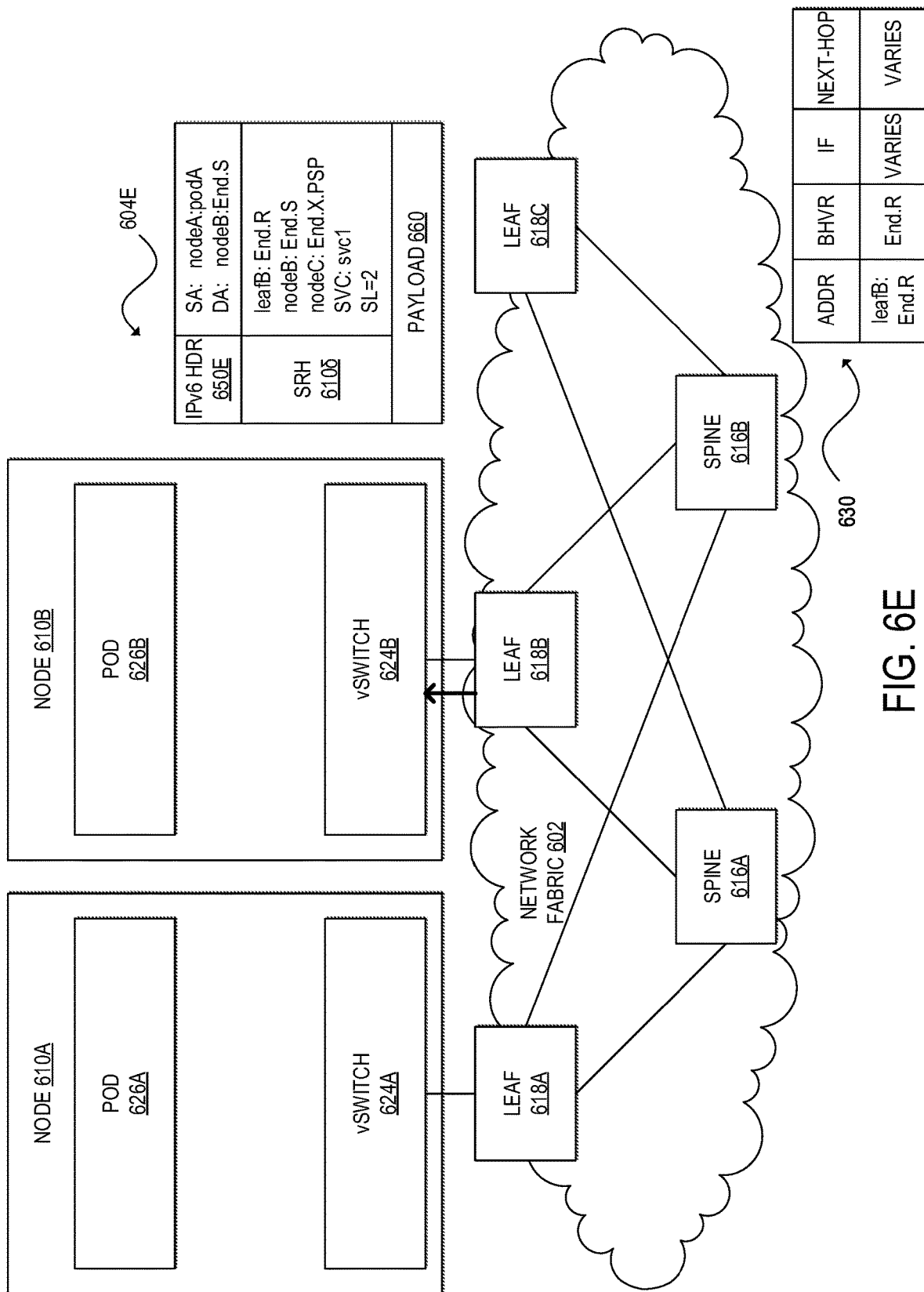

FIG. 6E shows a local SID table 630 for the leaf switch 618B. Upon receiving the packet 604D (as shown in FIG. 6D), the leaf switch 618B can perform the End.R function (an example of an implementation of which is set forth in Table 5) and determine that there is an entry in its FIB for the next segment or SID (e.g., nodeB:End.S) and that the node 610B is reachable. Thus, the leaf switch 618B can decrement the Segments Left from 3 to 2, update the DA of the IPv6 header 650E to the next segment or SID (e.g., nodeB:End.S), perform a FIB lookup on the updated DA, and forward the packet 604 according to the matched entry. The state of the packet after SR processing by the leaf switch 618B is shown as SRv6 packet 604E.

Figure 6F:
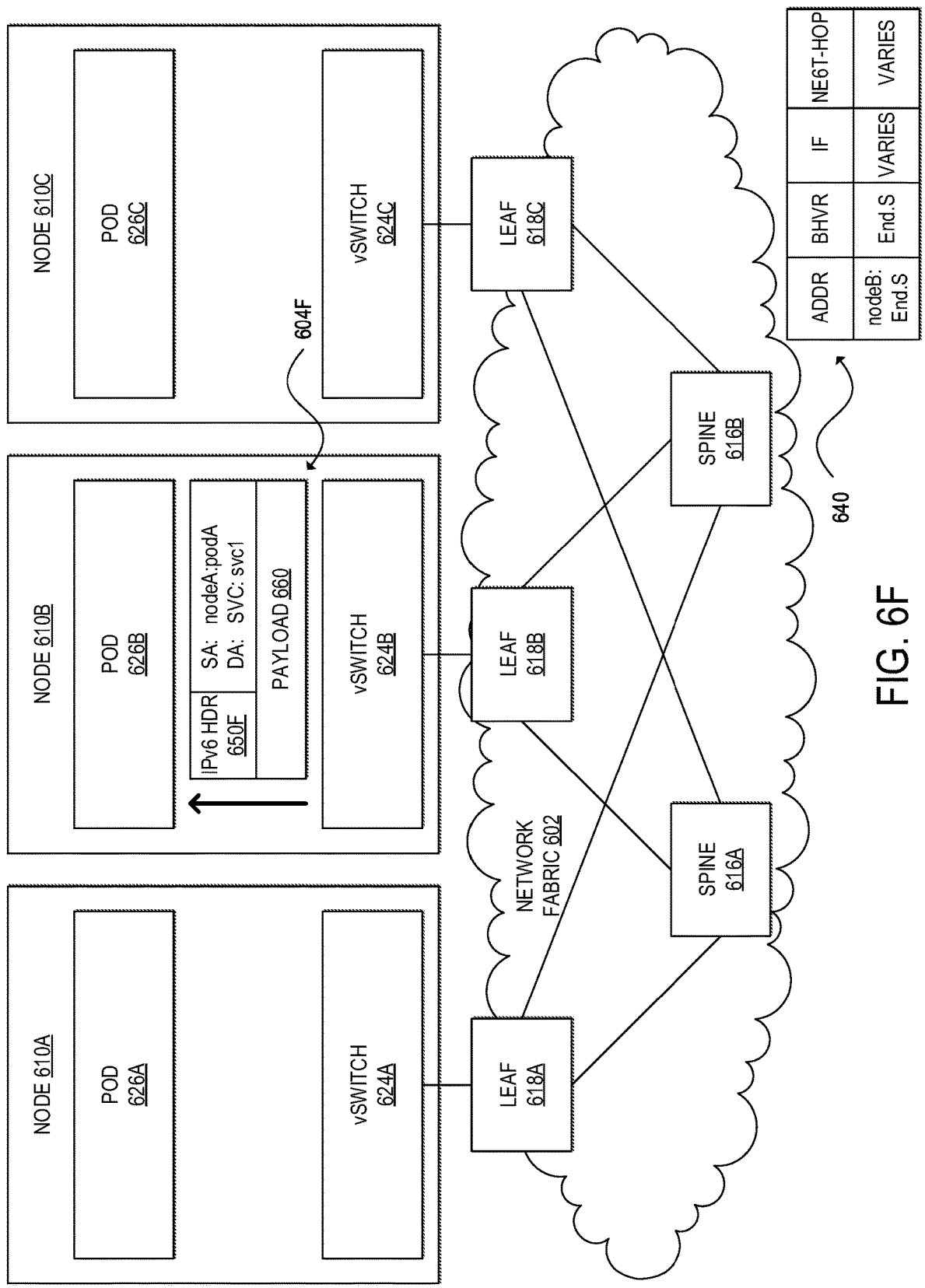

FIG. 6F shows a local SID table 640 for the vSwitch 624B. After receiving the packet 604E (as shown in FIG. 6E), the vSwitch 624B can perform the End. S function (an example of an implementation of which is set forth in Table 2) and determine that there is an entry in its FIB for the last segment or SID (e.g., SVC:svc1; to forward to an interface or next-hop corresponding to the container pod 626B). The vSwitch 624B can either de-encapsulate the SRv6 packet (e.g., remove the outer IPv6 and SR headers) and forward the de-encapsulated packet to the container pod 626B or remove the SR header, update the DA of the IPv6 header 650F to the last segment or SID, and forward the IPv6 packet to the container pod 626B. The state of the packet after SR processing by the vSwitch 624B is shown as IPv6 packet 604F.

Figure 7A:
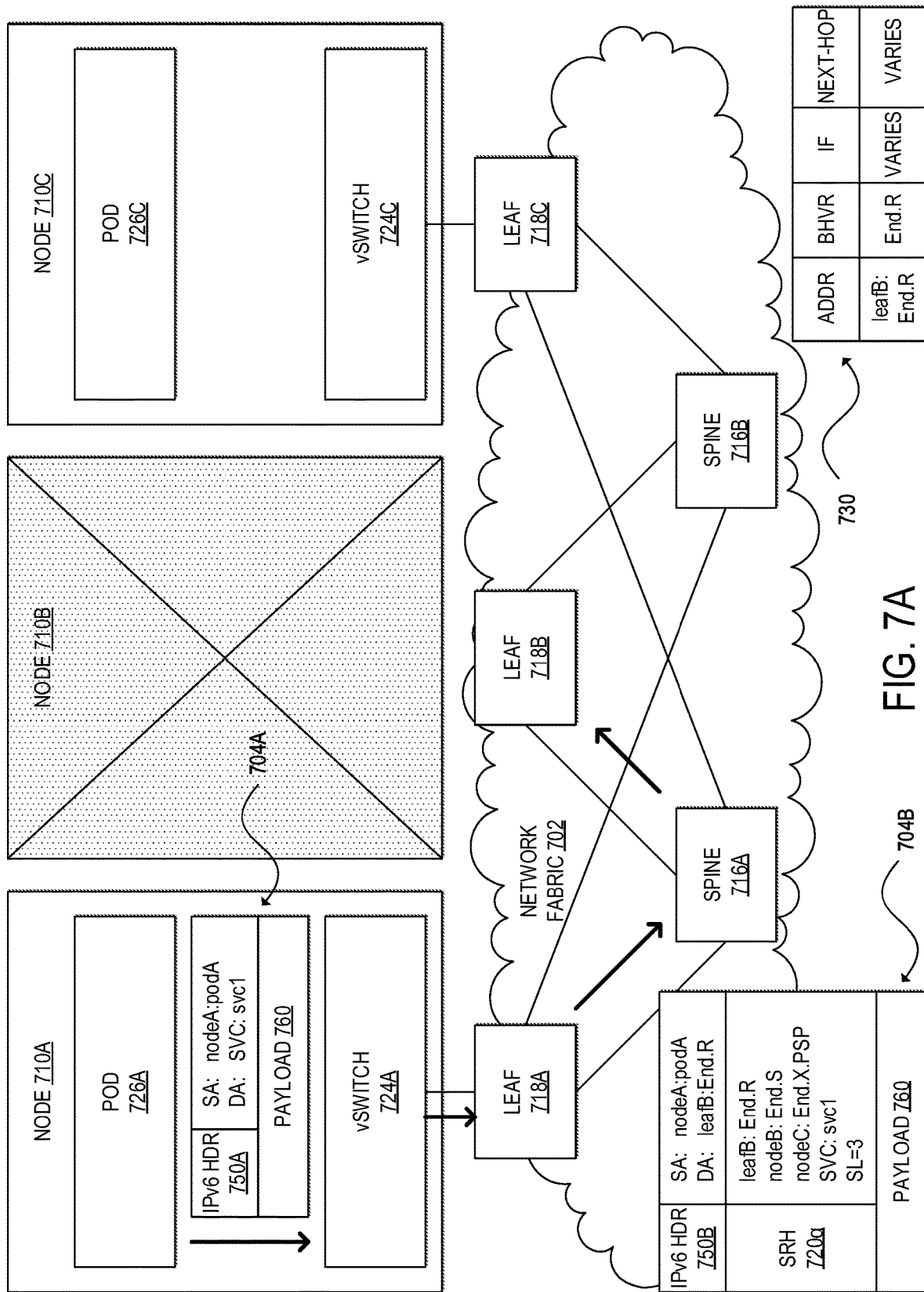
FIGS. 7A-7E illustrate examples of segment routing with fast reroute in the event a server is unreachable in accordance with an embodiment.

FIGS. 7A-7E illustrate an example of an IPv6 packet traversing a network fabric 702 (e.g., the network fabric 102 of FIG. 1) and how SRv6 can be used for fast reroute of the packet in the event of a failure or overloading of a container pod or node. FIG. 7A shows a first state of IPv6 packet 704A and a second state of the packet, encoded as SRv6 packet 704B, after transmission from a container pod 726A (e.g., the container pods 226 of FIG. 2) of a node 710A (e.g., the compute resources 110 of FIG. 1 or the worker nodes 220 of FIG. 2) through a virtual switch 724A (e.g., the networking interfaces 224 of FIG. 2) of the node 510A, a leaf switch 718A (e.g., the leaf switches 118 of FIG. 1) and spine switch 716A (e.g., the spine switches 116 of FIG. 1) of the network fabric 702, and just before the packet arrives at a leaf switch 718B. The current state of the packet may be similar to the state of the packet 604D of FIG. 6D. For example, the SRv6 packet 704B can include an IPv6 header 750B having an SA corresponding to the node 710A and container pod 726A (e.g., nodeA:podA) and a DA including a locator (e.g., the locator 344 of FIG. 3B) corresponding to the node 710B (e.g., nodeB) and a function (e.g., the function 346 of FIG. 3B) End.R. The SRv6 packet 704B can also include an SRH 720α (e.g., the SRH 320 of FIG. 3A) having a Segment List (e.g., the Segment List 340 of FIG. 3A) comprising segments or SIDs (e.g., the segments 342 of FIGS. 3A and 3B) leafB:End.R, nodeB:End.S, nodeC:End.X.PSP, and SVC: syc1, and a value of 3 for Segments Left (e.g., the Segments Left 328 of FIG. 3A). In addition, the SRv6 packet 704B can include a payload 760 (e.g., the payload 360 of FIG. 3), which can be an unmodified IPv6 packet if the packet has been encapsulated or an IPv6 payload if direct or inline insertion has been applied to the packet. FIG. 7A also shows a local SID table 730 for the leaf switch 718 with an entry for nodeB:End.R.

However, in this example and unlike the example of FIGS. 6A-6F, a node 710B has failed, is overloaded, or is otherwise unreachable. Thus, after the leaf switch 718B receives the SRv6 packet 704B and initiates the End.R function (an example of an implementation of which is set forth in Table 5), the leaf switch 718B may fail to match the next segment or SID (e.g., nodeB:End.S) to an entry in its FIB. Accordingly, the leaf switch 718B can perform an FRR on the SRv6 packet 704B (e.g., decrease the Segment List by 2, update the IPv6 DA with SRH[SL], FIB lookup on the updated DA, and forward according to the matched entry).

That is, upon detecting that the node 710B is unreachable, the leaf switch 718B can immediately reroute the packet 704B to a secondary path or route.

Figure 7B:
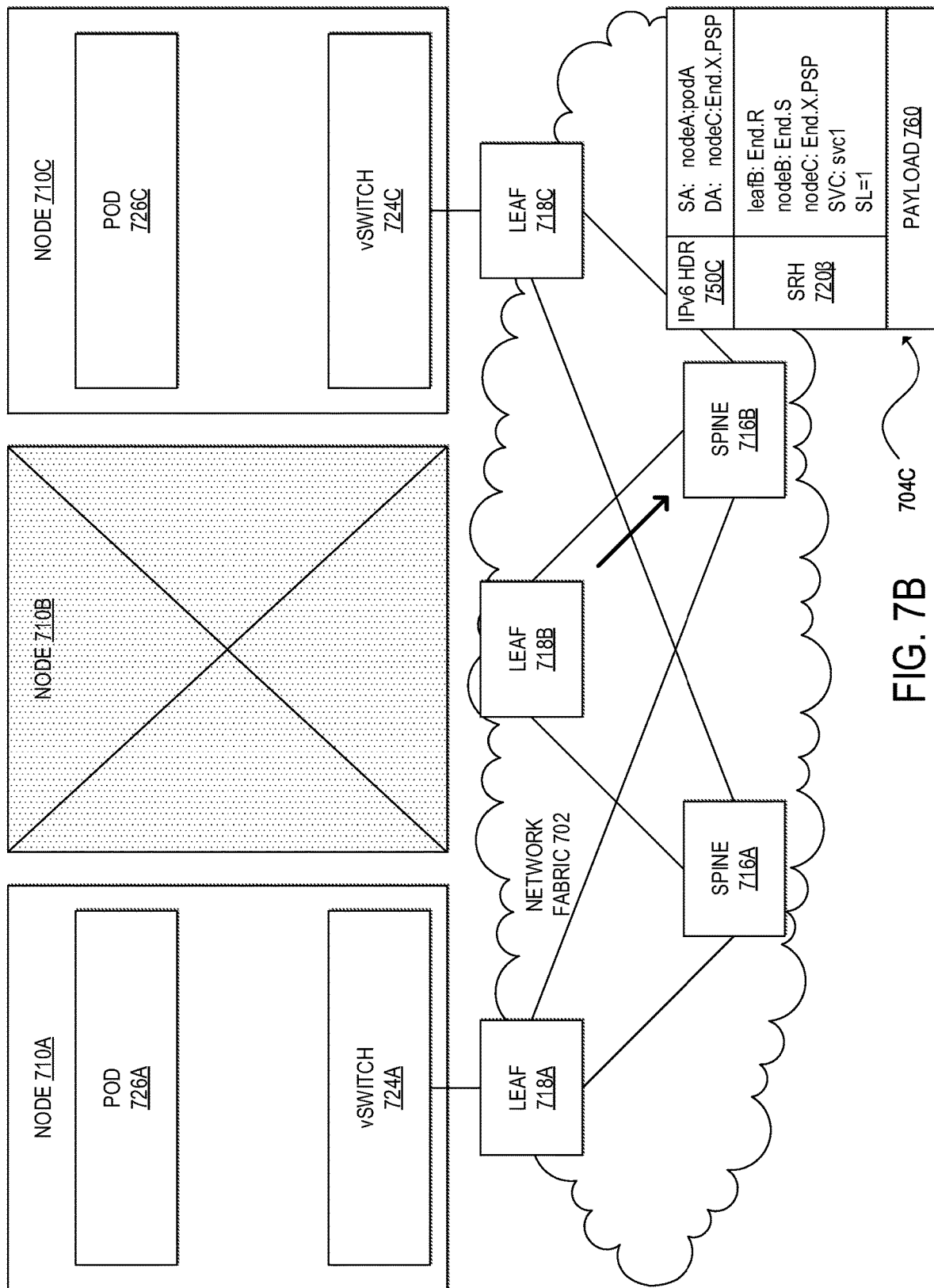

FIG. 7B shows a state of SRv6 packet 704C after the leaf switch 718B performs the FRR on the packet. For example, the leaf switch 718B can decrease the value of the Segments Left (SL) in the SRH 720β from 3 to 1. In addition, the leaf switch 718B can update the DA in the IPv6 header 750C to be the new active segment in the Segment List of the SRH 720β from leafB:End.R to nodeC:End.X.PSP. Finally, the leaf switch 718B can perform a FIB lookup on the updated DA and forward the packet 704C according to the matched entry. In some embodiments, the ingress SR device (e.g., the vSwitch 724A) can also be reprogrammed to reflect the unavailability of the node 710B, such as to update its Segment List to include one or more different segments or SIDs (e.g., a new primary route or path and, optionally, one or more new secondary routes or paths).

Figure 7C:
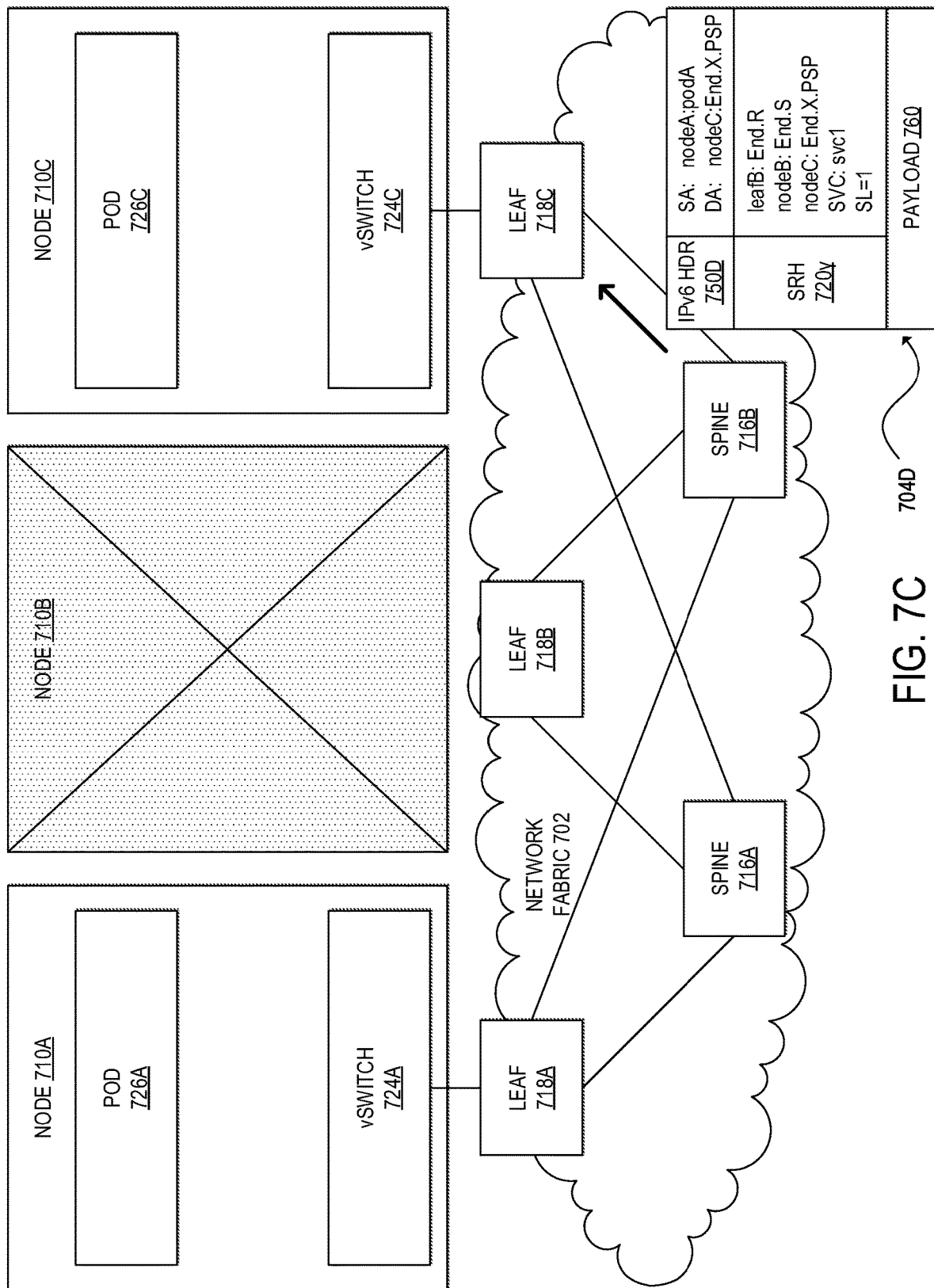

FIG. 7C shows the state of SRv6 packet 704D after the spine switch 716B has forwarded it and before the leaf switch 718C receives it. As discussed, the spine switch 716B can operate as a non-SR transit device and forward the packet 704D on the basis of the IPv6 header 750D. The spine switch 716B can ignore the SRH 720γ and leave the packet 704D unchanged from its previous state.

Figure 7D:
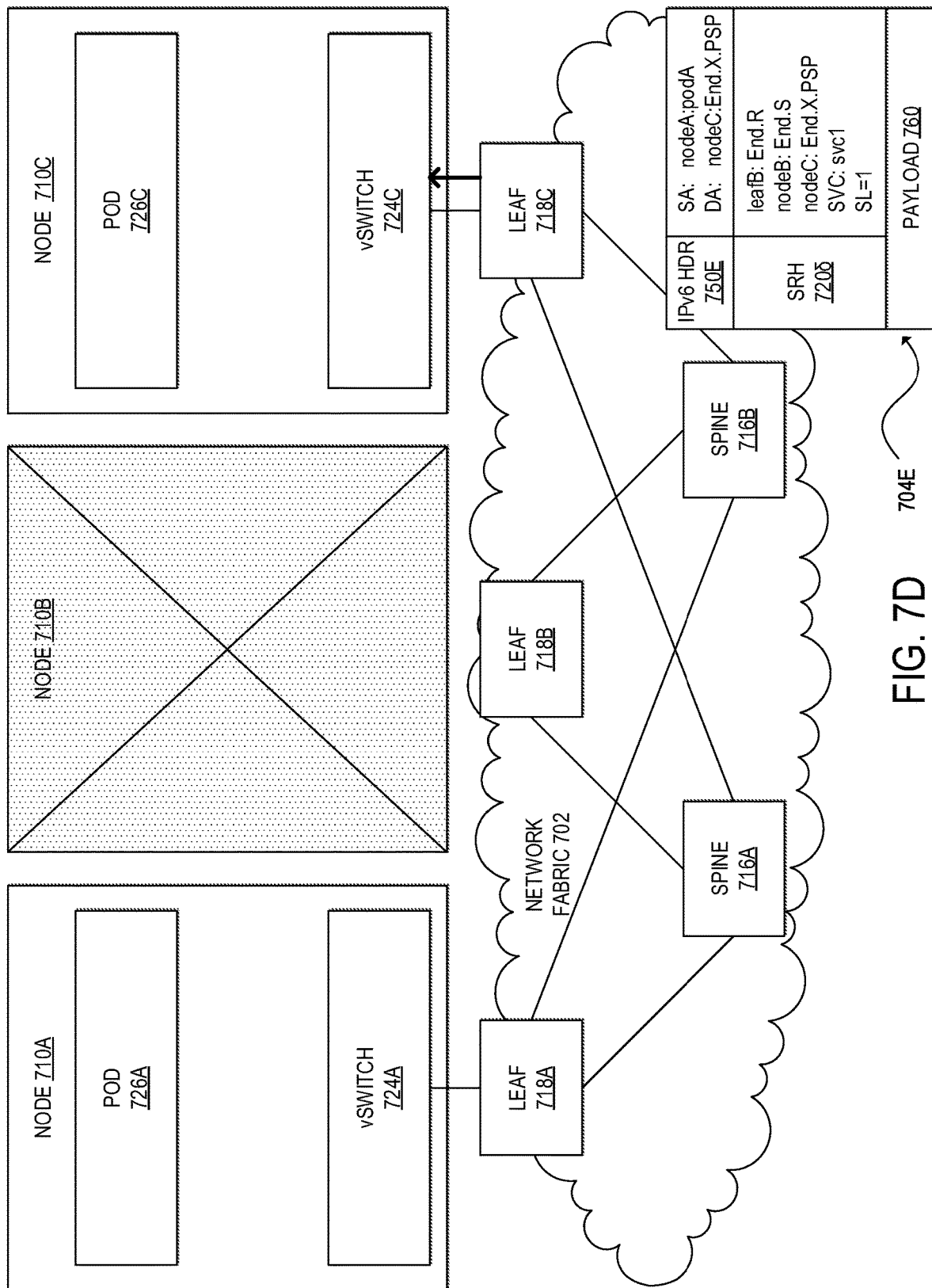

FIG. 7D shows a state of SRv6 packet 704E after the leaf switch 718C forwards it to a vSwitch 724C of a node 710C. In this example, the leaf switch 718C can support SRv6 and operate as an SR transit device to form a part of the shortest path from the leaf switch 718B to the node 710C. As such, the state of the SRv6 packet 704E can remain unchanged from its previous state.

Figure 7E:
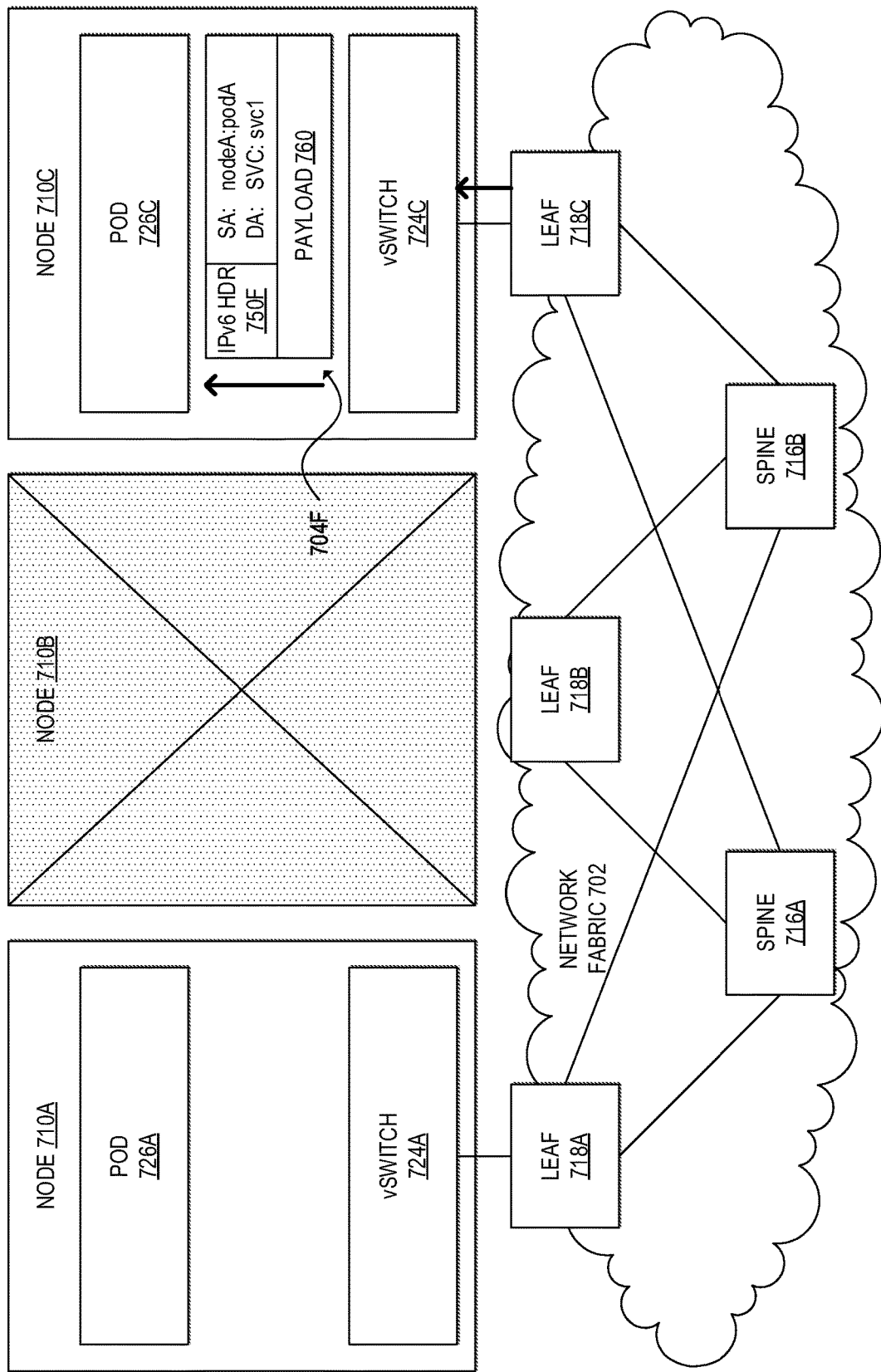

FIG. 7E shows a state of IPv6 packet 704F after SR processing by the vSwitch 724C. This can involve performing the End.X.PSP function (e.g., examples of implementations of which are set forth in Tables 3 and 4) on the packet. For example, the vSwitch 724C can decrement the Segments List from 1 to 0, pop the outer IPv6 header and SRH (if the packet was encapsulated) or update the DA of an IPv6 header to SVC:svc1 and pop the SRH (if direct or inline insertion was applied to the packet), and perform IPv6 processing on the packet (e.g., forward to an interface or next-hop corresponding to the container pod 726C).

Figure 8:
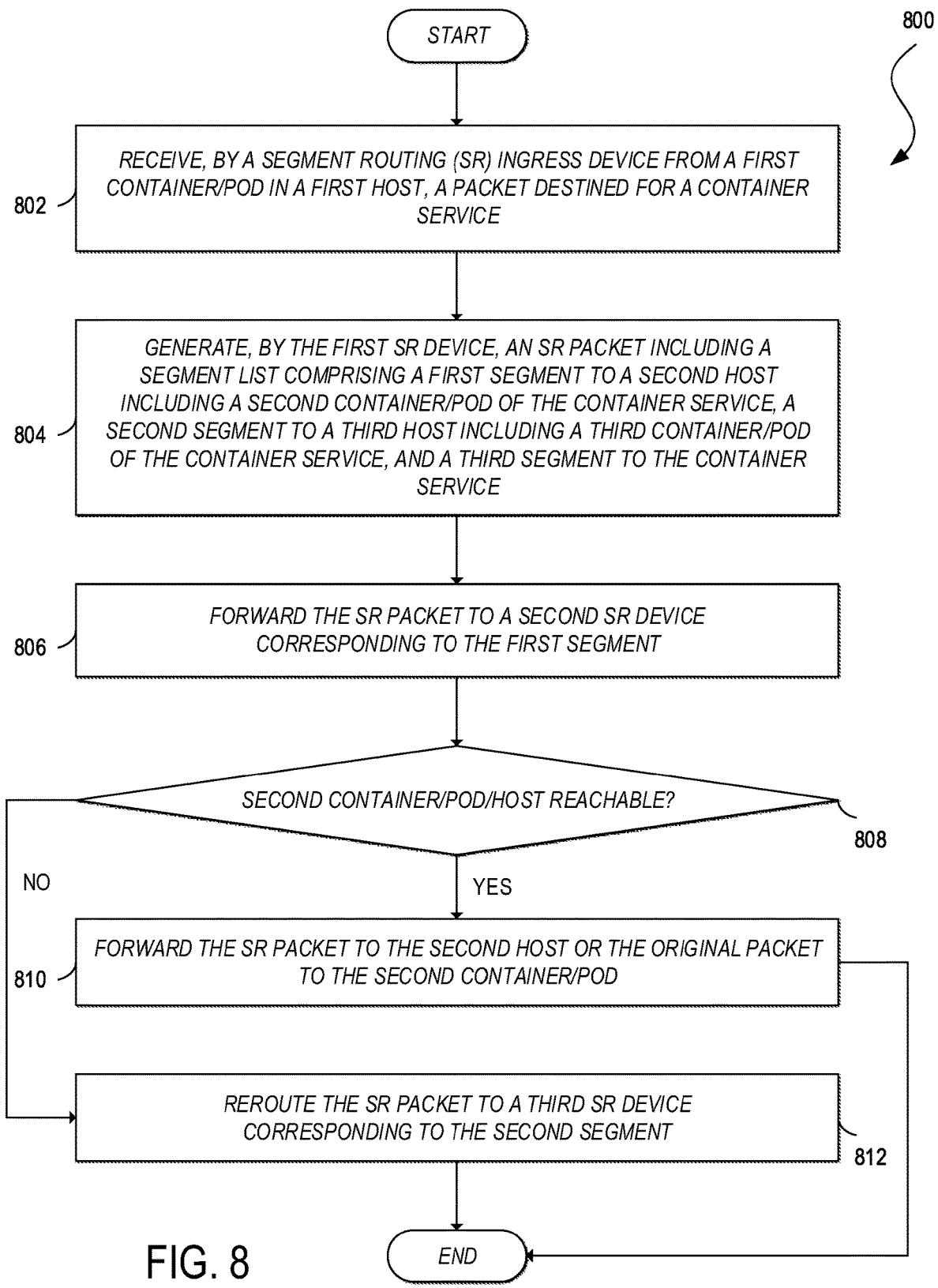
FIG. 8 illustrates an example of a process for enabling segment routing with fast reroute in the event that a container pod or host is unreachable in accordance with an embodiment.

FIG. 8 illustrates an example of a process 800 for providing segment routing with fast reroute in the event that a container/pod or host is unreachable. The process 800 may begin with an SR ingress device (e.g., vSwitches 224 of FIG. 2, SRv6 vSwitches 424A of FIGS. 4A-4D, SRv6 vSwitches 524A of FIGS. 5A-5D, physical switches 618 of FIGS. 6A-6F, physical switches 718 of FIGS. 7A-7E, etc.) receiving a packet (e.g., an IPv6 packet) from a first container/pod (e.g., the containers 228/pods 226 of FIG. 2) in a first host (e.g., the physical or virtual servers 110). The packet may be destined for a container service. The container service may have a network address associated with multiple containers/pods in multiple hosts, including at least a second container/pod in a second host and a third container/pod in a third host. For example, the network address may be a Kubernetes® ClusterIP, NodePort, LoadBalancer, and/or ExternalName. Examples of this step are shown and discussed with respect to FIGS. 4A, 5A, 6A, and 7A.

The process 800 can proceed to step 804 in which the SR ingress device may generate an SR packet that includes the original packet and a segment list. For example, the SR ingress device may be associated with a Binding Segment Identifier (BSID) corresponding to the container service that, upon a Destination Address (DA) of the packet matching the BSID, causes the instantiation of the segment list. In some embodiments, a network controller may associate the SR ingress device with the B SID and determine the segment list. In other embodiments, the SR ingress device can individually compute the segment list, such as by routing protocols (e.g., IS-IS, OSPF, BGP, etc.) and individually impose the BSID.

In some embodiments, the SR ingress device can use encapsulation for generating the SR packet. For instance, the SR ingress device can create an outer IPv6 header including a Source Address (SA) corresponding to the originating host and container/pod and a DA corresponding to the first segment or Segment Identifier (SID) of the segment list. The SR ingress device can also create a Segment Routing Header (SRH) (e.g., the SRH 320) including SR metadata fields (e.g., Segments Left, Last Entry, Flags, etc.) and the segment list. The SR ingress device can append the outer IPv6 header, the SRH, and the original packet to generate the SR packet.

In other embodiments, the SR ingress device can use direct or inline insertion. For example, the SR ingress device can update the DA of the original packet header (e.g., IPv6 header) to be the first segment or SID of the segment list. Then, the SR ingress device can create the SRH and insert the SRH between the original packet header and original packet payload.

The segment list can include at least a first segment or SID to a second host including a second container/pod of the container service, a second segment or SID to a third host including a third container/pod of the container service, and a third segment or SID to the container service. There can be zero SIDS or one or more SIDS before the first SID, in between each of the first, second, and third SIDS, and after the third SID. There can be a primary SR egress device and one or more secondary SR egress devices. In some embodiments, the SIDS may comprise locators corresponding to SR segment endpoints and SR instructions, such as the SR instructions set forth in Table 1. Examples of step 804 are shown and discussed with respect to FIGS. 4B, 5B, 6B, and 7B.

At step 806, the SR packet can be forwarded to a second SR device corresponding to the first segment or SID. In some cases, the second SR device can be a vSwitch in a second host including a second container/pod of the container service. That is, the second SR device can be an SR egress device. For instance, FIGS. 4B-4C and 5A show examples of an SR ingress device (e.g., vSwitches 424A and 524A, respectively) forwarding an SRv6 packet (e.g., SRv6 packets 404B/404C and 504B, respectively) to a first SR egress device (e.g., vSwitches 424B and 524B, respectively). In some embodiments, the second SR device can be a physical switch adjacent to the second host. For instance, FIGS. 6B-6D and 7A show an SR ingress device (e.g., vSwitches 624A and 724A, respectively) forwarding an SRv6 packet (e.g., packets 604B/604C/604D and 704B, respectively) to the leaf switch 718B (with leaf switch 718A operating as an SR transit device and the spine switch 716A operating as a non-SR transit device). In still other embodiments, there may be one or more segments or SIDS in the segment list before the first segment or SID corresponding to the second SR device including the second container/pod of the container service.

At decision point 808, the second SR device can determine whether the second host and/or second container/pod are reachable. For example, the second SR device can perform a lookup in its FIB for a segment or SID corresponding to the second host or a segment or SID corresponding to the second container/pod. As another example, the second SR device can periodically poll the second host and/or second container/pod to determine their reachability. As yet another example, the second host and/or second container may periodically send the second SR device heartbeat messages to indicate their reachability.

If the second host and second container/host are reachable, the process 800 may continue to step 810, which can include forwarding the SR packet to the second host or the original packet to second container/pod depending whether or not the second SR device is an SR egress device. For example, if the second SR device is an SR egress device, the second SR device can de-encapsulate the SR packet (or update the DA to be the third segment and remove the SRH from the SR packet) and forward the recovered original packet to the second container/pod. Examples of these operations are shown and discussed with respect to FIGS. 4C-4D. On the other hand, if the second SR device is not an SR egress device, the second SR device can decrement the Segments Left, update the DA of the IP header to the new active segment or SID, and forward the SR packet to the second host. Examples of these operations are shown and discussed with respect to FIG. 6E. The SR device of the second host (e.g., the vSwitch 624B) can operate as an SR egress device and evaluate whether the second container/pod (e.g., the container pod 626B) is reachable, and if so, de-encapsulate the SR packet and forward the de-encapsulated packet to the second container/pod as shown and discussed with respect to FIG. 6F.

If the second host and/or second container/pod are unreachable, the process may progress to step 812, which can involve rerouting the SR packet to a third SR device corresponding to the second segment or SID as shown and discussed, for example, with respect to FIGS. 5B-5C and FIGS. 7B-7D. The third SR device can operate as an SR egress device and can evaluate whether the third container/pod (e.g., the container pods 526B and 72B) is reachable, and if so, de-encapsulate the SR packet and forward the de-encapsulated packet to the third container/pod as shown and discussed with respect to FIGS. 5D and 7E. In some embodiments, the third host or third container/pod may also be unreachable, and the SR ingress device may include an additional segment or SID for fast reroute to a fourth host including a fourth container/pod of the container service. The SR ingress device may include as many additional segments or SIDs in the segment list as there are secondary SR egress devices available in the network.

Figure 9A:
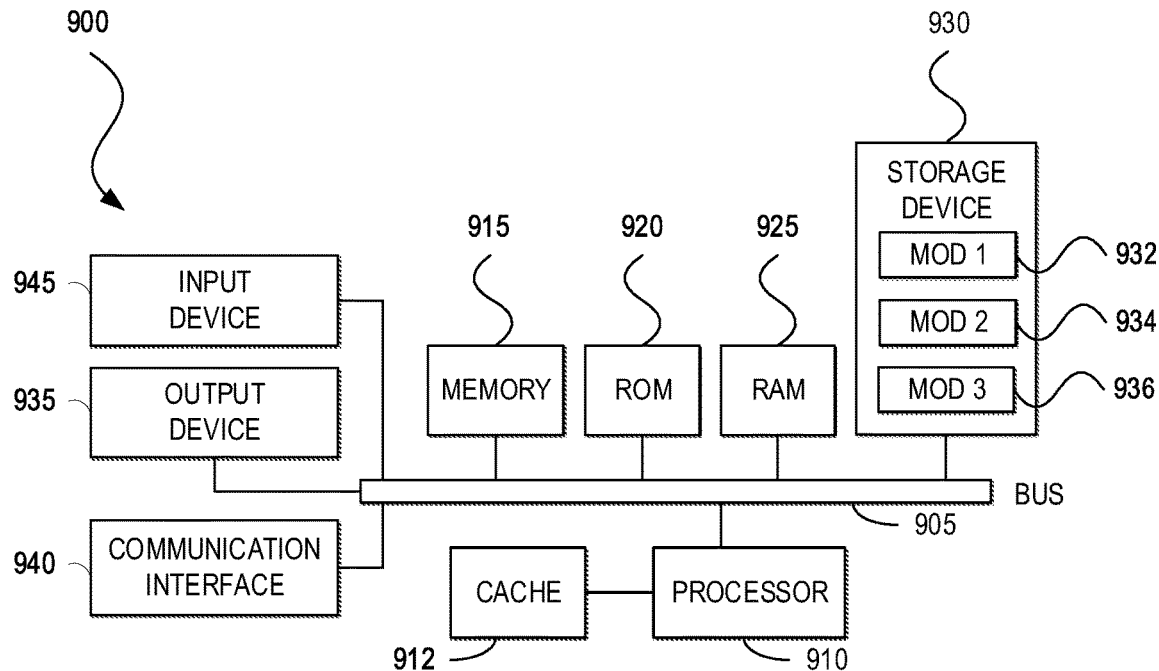
FIGS. 9A and 9B illustrate examples of systems in accordance with some embodiments.
Figure 9B:
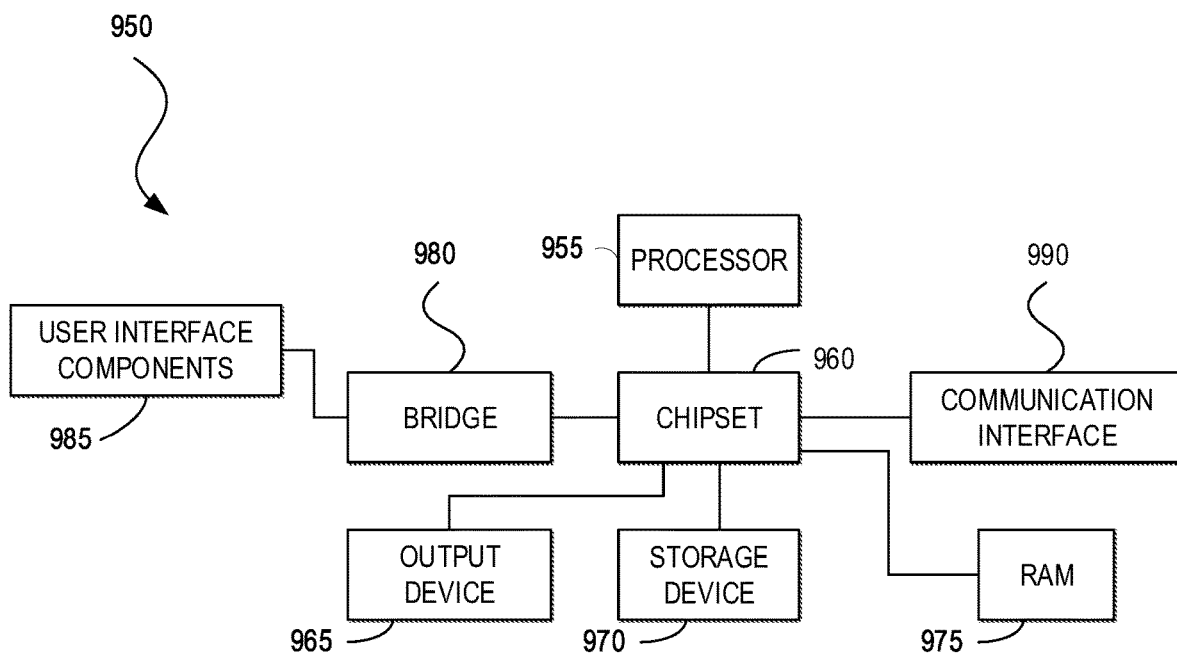

FIG. 9A and FIG. 9B illustrate systems in accordance with various embodiments. The more appropriate system will be apparent to those of ordinary skill in the art when practicing the various embodiments. Persons of ordinary skill in the art will also readily appreciate that other systems are possible.

FIG. 9A illustrates an example of a bus computing system 900 wherein the components of the system are in electrical communication with each other using a bus 905. The computing system 900 can include a processing unit (CPU or processor) 910 and a system bus 905 that may couple various system components including the system memory 915, such as read only memory (ROM) 920 and random access memory (RAM) 925, to the processor 910. The computing system 900 can include a cache 912 of high-speed memory connected directly with, in close proximity to, or integrated as part of the processor 910. The computing system 900 can copy data from the memory 915, ROM 920, RAM 925, and/or storage device 930 to the cache 912 for quick access by the processor 910. In this way, the cache 912 can provide a performance boost that avoids processor delays while waiting for data. These and other modules can control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in the storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing system 900, an input device 945 can represent any number of input mechanisms, such as a microphone for speech, a touch-protected screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing system 900. The communications interface 940 can govern and manage the user input and system output. There may be no restriction on operating on any particular hardware arrangement and therefore the basic features here may easily be substituted for improved hardware or firmware arrangements as they are developed.

The storage device 930 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 930 can include the software modules 932, 934, 936 for controlling the processor 910. Other hardware or software modules are contemplated. The storage device 930 can be connected to the system bus 905. In some embodiments, a hardware module that performs a particular function can include a software component stored in a computer-readable medium in connection with the necessary hardware components, such as the processor 910, bus 905, output device 935, and so forth, to carry out the function.

FIG. 9B illustrates an example architecture for a conventional chipset computing system 950 that can be used in accordance with an embodiment. The computing system 950 can include a processor 955, representative of any number of physically and/or logically distinct resources capable of executing software, firmware, and hardware configured to perform identified computations. The processor 955 can communicate with a chipset 960 that can control input to and output from the processor 955. In this example, the chipset 960 can output information to an output device 965, such as a display, and can read and write information to storage device 970, which can include magnetic media, solid state media, and other suitable storage media. The chipset 960 can also read data from and write data to RAM 975. A bridge 980 for interfacing with a variety of user interface components 985 can be provided for interfacing with the chipset 960. The user interface components 985 can include a keyboard, a microphone, touch detection and processing circuitry, a pointing device, such as a mouse, and so on. Inputs to the computing system 950 can come from any of a variety of sources, machine generated and/or human generated.

The chipset 960 can also interface with one or more communication interfaces 990 that can have different physical interfaces. The communication interfaces 990 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 955 analyzing data stored in the storage device 970 or the RAM 975. Further, the computing system 950 can receive inputs from a user via the user interface components 985 and execute appropriate functions, such as browsing functions by interpreting these inputs using the processor 955.

It will be appreciated that computing systems 900 and 950 can have more than one processor 910 and 955, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method performed by a first segment routing device, the method comprising:
   receiving, from a second segment routing device, a segment routing packet including a segment list and a packet destined for a container service, the segment routing list including a first segment associated with a first container of the container service and a second segment associated with a second container of the container service, wherein the segment routing packet is generated by the second segment routing device;
   based on a determination that the first container is unable to process the packet, updating the segment routing packet to identify the second segment as a next destination of the segment routing packet;
   rerouting the segment routing packet to the second segment associated with the second container of the container service;
   updating the segment list to include one or more segments different from the first segment; and
   triggering a programming, by the first segment routing device, of the second segment routing device to reflect that a host of the first container is unreachable.

2. The method of claim 1, wherein the determination that the first container is unable to process the packet comprises a determination that a host of the first container is unreachable.

3. The method of claim 1, wherein the packet is encapsulated with an outer Internet Protocol (IP) header and a segment routing header including the segment routing list, and wherein rerouting the segment routing packet comprises decapsulating the packet and forwarding the packet to a destination address in an inner IP header of the decapsulated packet.

4. The method of claim 1, wherein the first segment comprises a first host of a first pod associated with the container service and the second segment comprises a second host of a second pod associated with the container service.

5. The method of claim 4, wherein the first pod comprises the first container and the second pod comprises the second container.

6. The method of claim 1, wherein the segment routing packet is received via a segment routing device, the segment routing device comprising one of a virtual switch in a host of a third container associated with a current segment in the segment list or a network device connected to the host.

7. The method of claim 1, further comprising:
   receiving a second segment routing packet including a second segment list and a second packet destined for a second container service, the second segment routing list including a third segment associated with a third container of the second container service and one or more segments associated with a one or more containers of the second container service; and
   based on an additional determination that the third container is able to process the second packet, forwarding at least one of the second segment routing packet or the second packet to a host associated with the third segment.

8. The method of claim 1, wherein the packet is encapsulated with an outer Internet Protocol (IP) header and a segment routing header including the segment list, and wherein the packet includes an IP header and a payload.

9. The method of claim 8, wherein updating the segment routing packet to identify the second segment as the next destination of the segment routing packet comprises updating the segment routing header and updating an IP address in the outer IP header.

10. A system comprising:
    one or more processors; and
    at least one computer-readable storage medium having stored therein instructions which, when executed by the one or more processors, cause the one or more processors to:
    receive a segment routing packet including a segment list and a packet destined for a container service, the segment routing list including a first segment associated with a first container of the container service and a second segment associated with a second container of the container service, wherein the segment routing packet is generated by a segment routing device;
    based on a determination that the first container is unable to process the packet, update the segment routing packet to identify the second segment as a next destination of the segment routing packet;
    reroute the segment routing packet to the second segment associated with the second container of the container service;
    update the segment list to include one or more segments different from the first segment and
    programming the segment routing device to reflect that a host of the first container is unreachable.

11. The system of claim 10, wherein the segment routing packet comprises a binding segment identifier (BSID) for the container service, and wherein the BSID is associated with a segment routing policy.

12. The system of claim 10, wherein one or more segments of the segment list include a locator and a segment routing function.

13. The system of claim 10, wherein the determination that the first container is unable to process the packet comprises a determination that a host of the first container is unreachable.

14. The system of claim 10, wherein the packet is encapsulated with an outer Internet Protocol (IP) header and a segment routing header including the segment routing list, and wherein rerouting the segment routing packet comprises decapsulating the packet and forwarding the packet to a destination address in an inner IP header of the decapsulated packet.

15. The system of claim 10, wherein the first segment comprises a first host of a first pod associated with the container service and the second segment comprises a second host of a second pod associated with the container service.

16. The system of claim 15, wherein the first pod comprises the first container and the second pod comprises the second container.

17. The system of claim 10, wherein the instructions, when executed by the one or more processors, cause the one or more processors to:

receive a second segment routing packet including a second segment list and a second packet destined for a second container service, the second segment routing list including a third segment associated with a third container of the second container service and one or more segments associated with a one or more containers of the second container service; and based on an additional determination that the third container is able to process the second packet, forward at least one of the second segment routing packet or the second packet to a host associated with the third segment.

18. A non-transitory computer-readable storage medium having stored therein instructions which, when executed by one or more processors, cause the one or more processors to:

receive a segment routing packet including a segment list and a packet destined for a container service, the segment routing list including a first segment associated with a first container of the container service and a second segment associated with a second container of the container service, wherein the segment routing packet is generated by a segment routing device;

based on a determination that the first container is unable to process the packet, update the segment routing packet to identify the second segment as a next destination of the segment routing packet;

reroute the segment routing packet to the second segment associated with the second container of the container service;

update the segment list to include one or more segments different from the first segment and programming the segment routing device to reflect that a host of the first container is unreachable.

19. The non-transitory computer-readable storage medium of claim 18, wherein the determination that the first container is unable to process the packet comprises a determination that a host of the first container is unreachable.

20. The non-transitory computer-readable storage medium of claim 18, wherein the instructions when executed further cause the one or more processors to:

instantiate the first container in a first container pod and the second container in a second container pod.

* * * * *